United States Patent [19]

Yamashita et al.

[11] 4,117,813
[45] Oct. 3, 1978

[54] INTERNAL COMBUSTION ENGINE AND METHOD OF OPERATING IT

[75] Inventors: Ryuichi Yamashita; Hiromitsu Matsumoto, Hamamatsu, both of Japan

[73] Assignee: Yamaha Hatsudoki Kabushiki Kaisha, Iwata, Japan

[21] Appl. No.: 736,461

[22] Filed: Oct. 28, 1976

Related U.S. Application Data

[60] Continuation of Ser. No. 496,142, Aug. 12, 1974, abandoned, which is a division of Ser. No. 496,141, Aug. 12, 1974, abandoned.

[51] Int. Cl.² ............... F02M 7/00; F02M 25/06; F02P 5/04; F02M 31/00
[52] U.S. Cl. ............... 123/119 R; 123/90.15; 123/117 A; 123/119 A; 123/122 AB; 123/139 HW; 123/179 G; 60/286; 60/298
[58] Field of Search ............... 123/90.15, 191, 119 R, 123/119 A, 122 AA, 122 AB, 139 AW, 32 ST, 32 CY, 32 SP, 117 A, 179 G; 60/286, 298; 261/41 D

[56] References Cited

U.S. PATENT DOCUMENTS

| | | | |
|---|---|---|---|
| 2,293,352 | 8/1942 | Molina | 123/122 AB |
| 2,822,253 | 2/1958 | Caddock | 123/141 X |
| 3,458,297 | 7/1969 | Anderson | 123/141 |
| 3,507,261 | 4/1970 | Myers et al. | 123/90.15 |
| 3,680,533 | 8/1972 | Soberski | 123/117 A |
| 3,762,381 | 10/1973 | Dave | 123/90.15 |
| 3,767,173 | 10/1973 | Ishii | 123/179 G |
| 3,812,832 | 5/1974 | Scott | 123/117 A |
| 3,814,071 | 6/1974 | Buchwald | 123/122 AB |
| 3,867,487 | 2/1975 | Matsumoto | 261/41 D |

FOREIGN PATENT DOCUMENTS 2,451,064  11/1975  Fed. Rep. of Germany ........ 123/90.15

*Primary Examiner*—Wendell E. Burns
*Attorney, Agent, or Firm*—Donald D. Mon

[57] ABSTRACT

An internal combustion engine and means to operate the same to produce minimal quantities and concentrations of oxides of nitrogen (NOx), carbon monoxide (CO) and unburned hydrocarbons (HC). The engine is operated with a lean air/fuel mixture at both low and high load conditions, thereby minimizing said emissions. Low load operation on lean mixtures is made possible by means and methods for maintaining at a suitably low numerical value the residual fraction which is defined as the ratio of gases in a cylinder from a previous cycle and the total gases in the cylinder for the next cycle (said gases from a previous cycle plus new mixture). Said means may comprise apparatus to shorten the duration of intake and exhaust valve overlap, or of opening the engine throttle wider than normal and retarding the ignition to reduce the engine speed at low loads. Means is preferably provided wherein the fuel in the air/fuel mixture is well-vaporized and the mixture is uniform and homogeneous. Some of such means may comprise vaporizing means whereby fuel film adherent to the wall of the engine's induction means is vaporized by heat, or is collected and discharged into the air stream.

93 Claims, 26 Drawing Figures

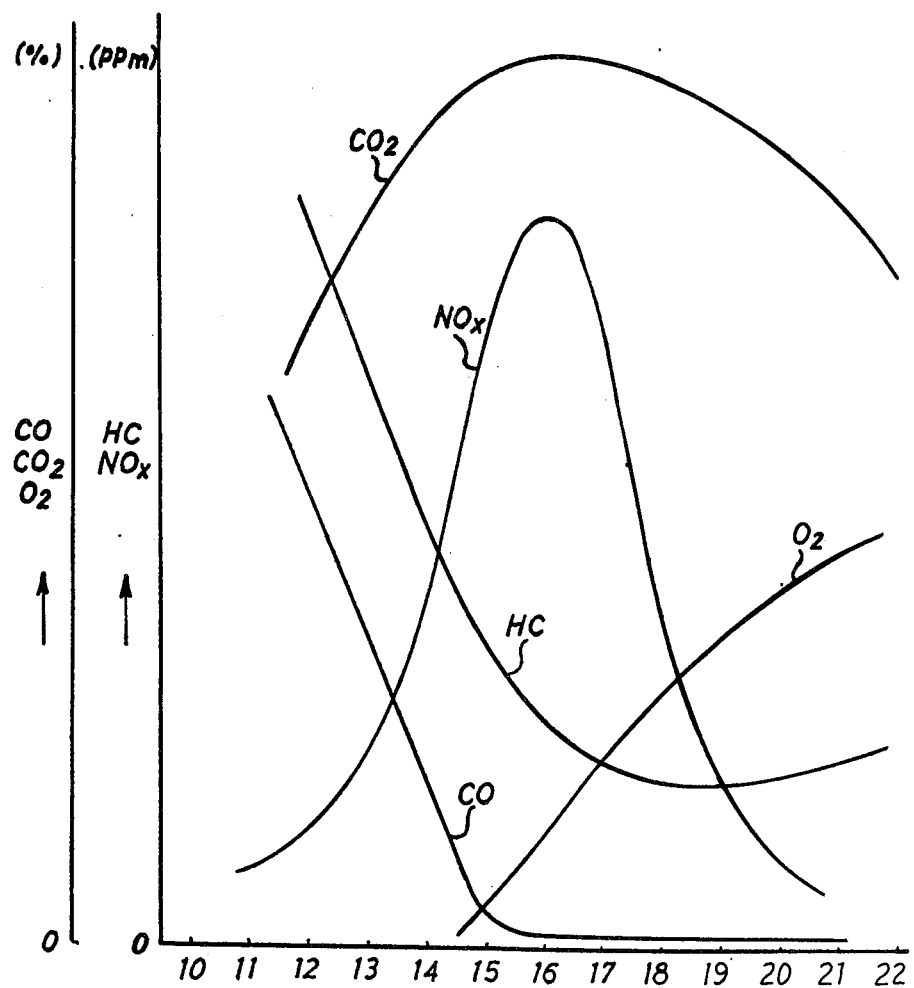

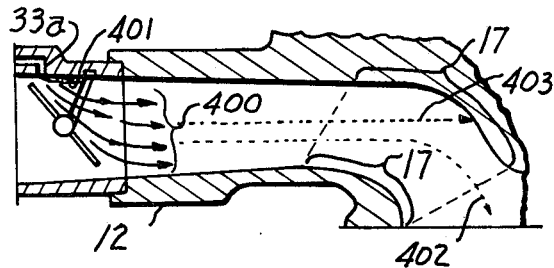
Fig.26
Fig.2
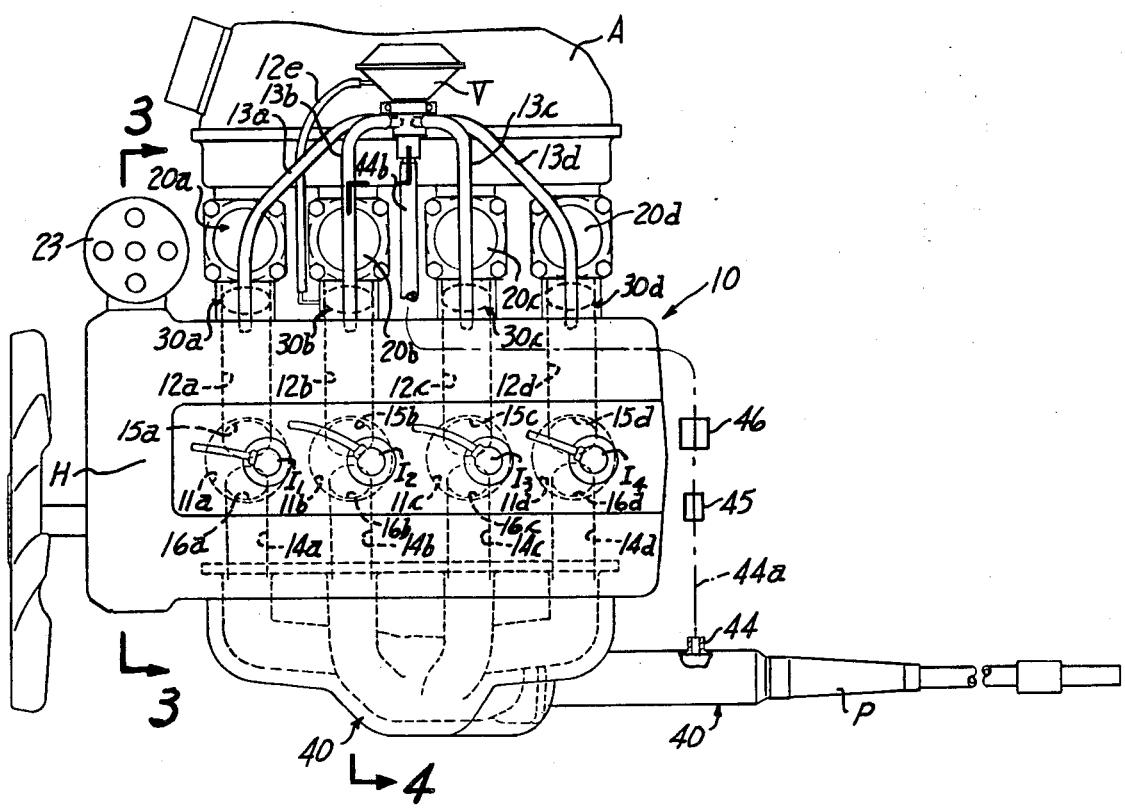
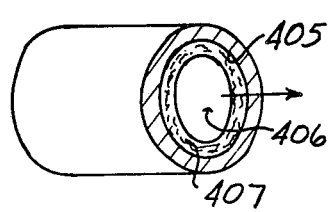
Fig.23
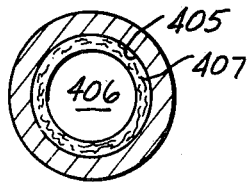
Fig.24
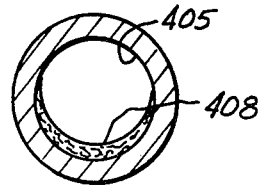
Fig.25

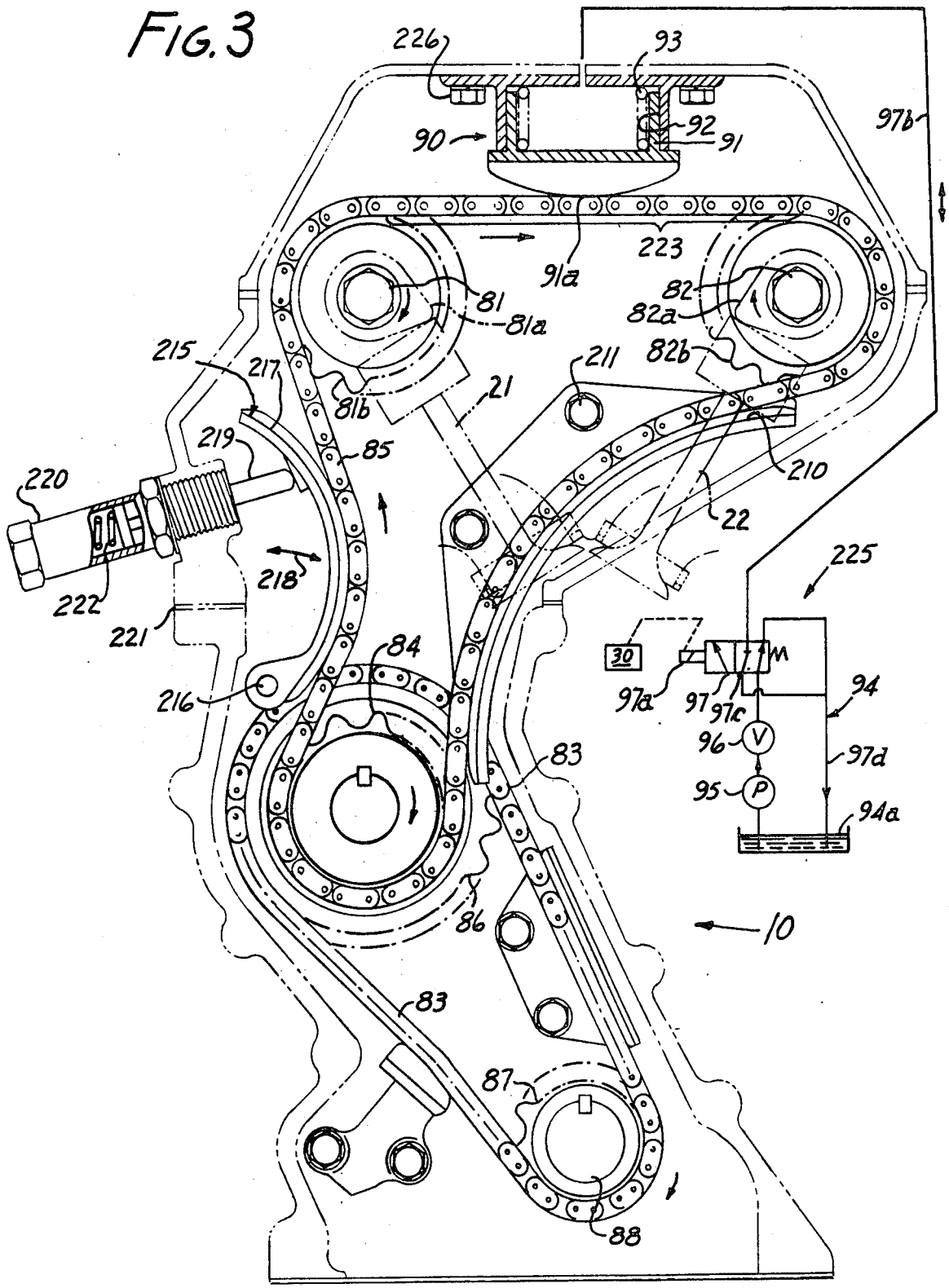

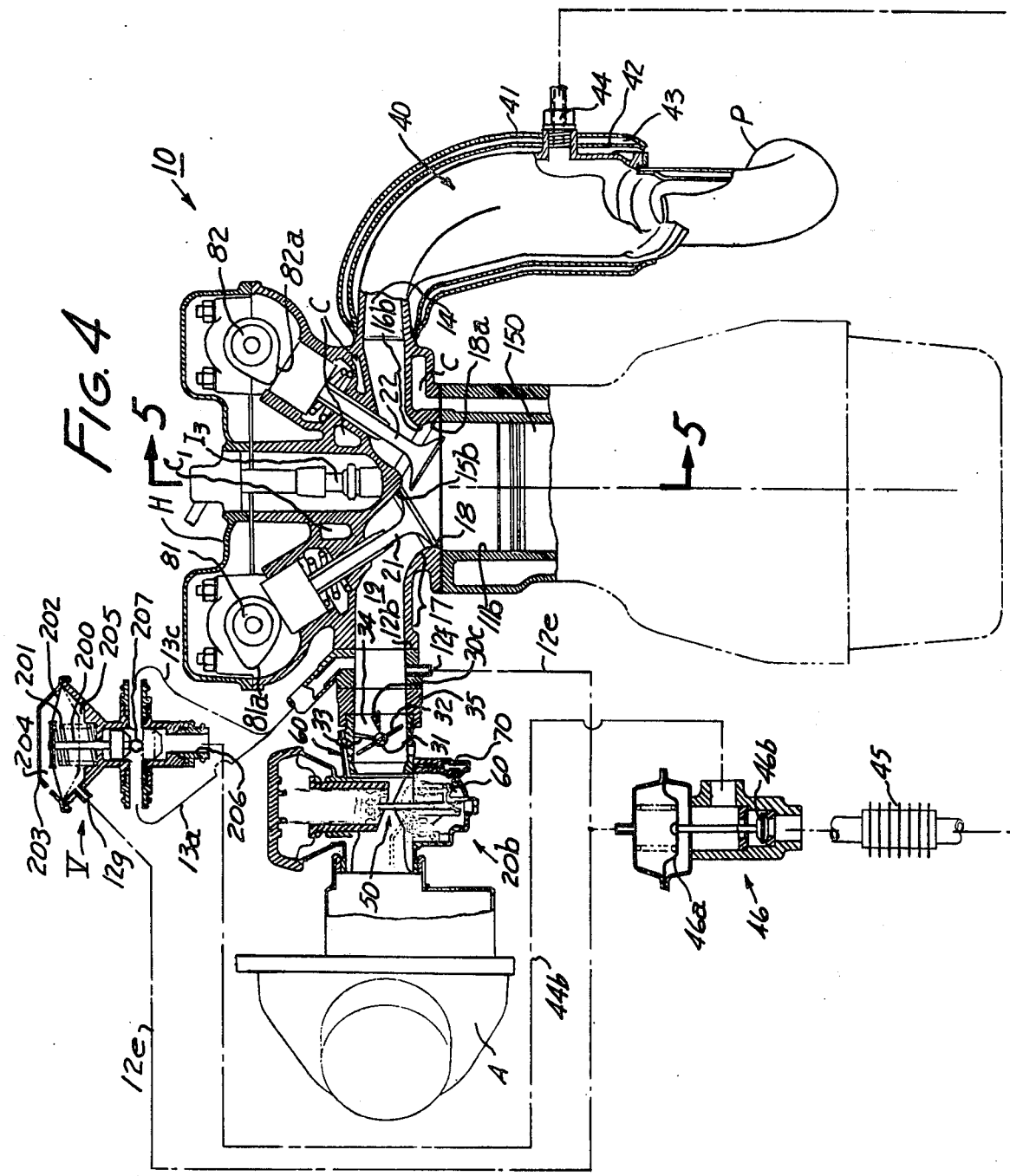

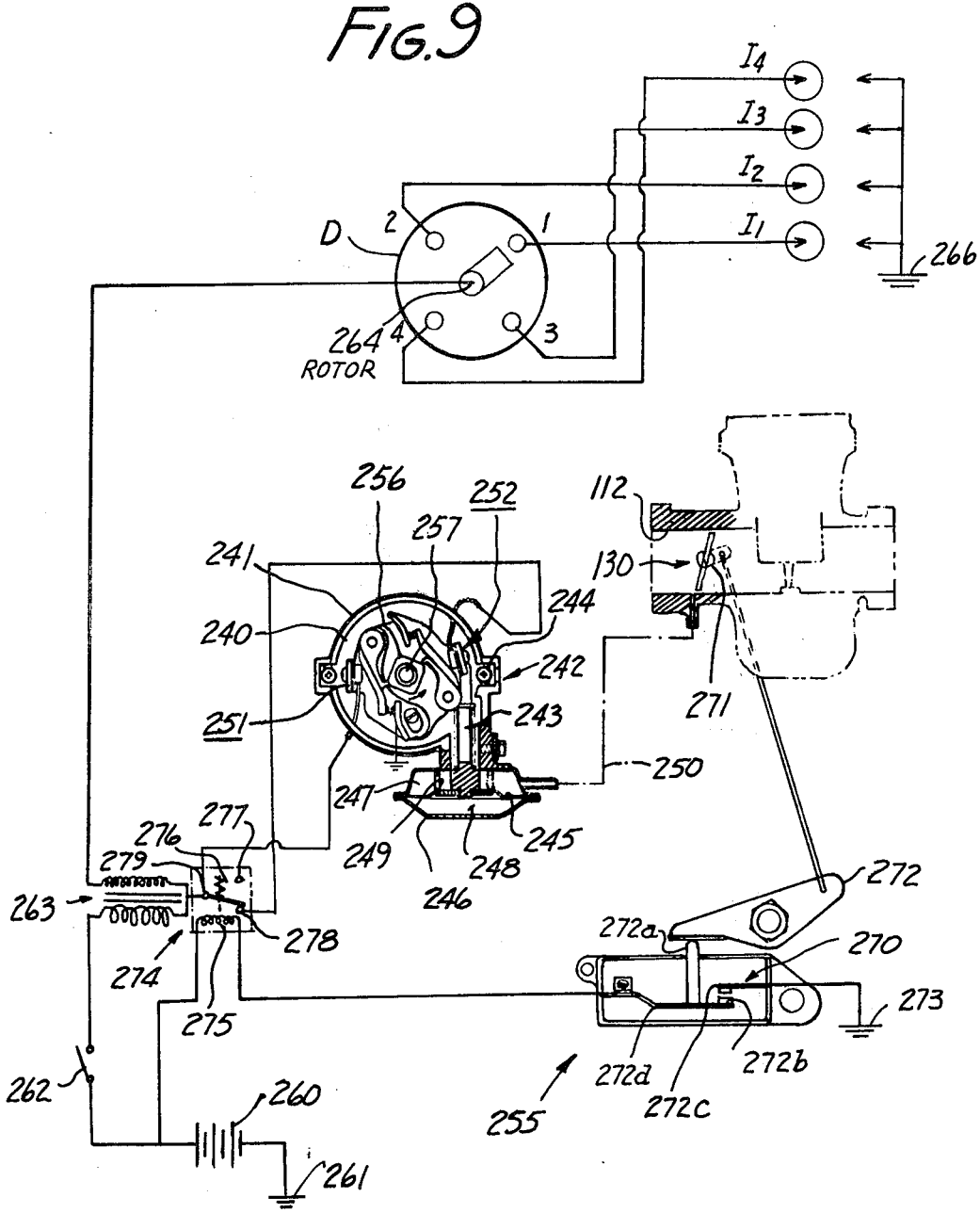

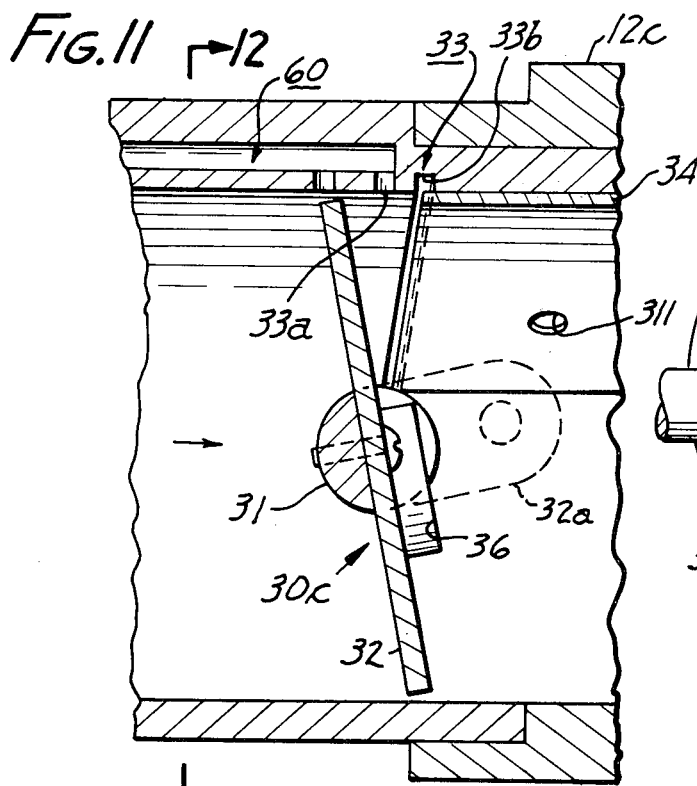
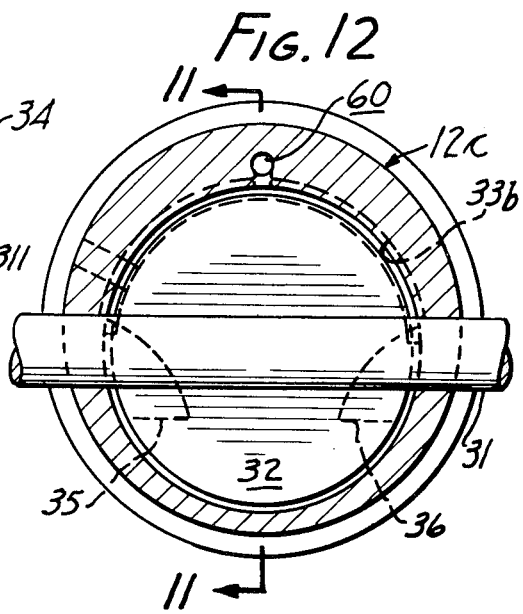
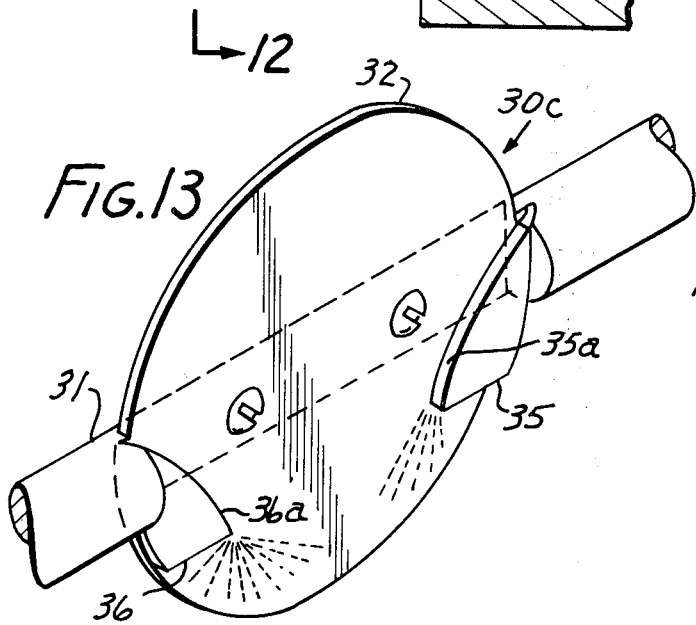
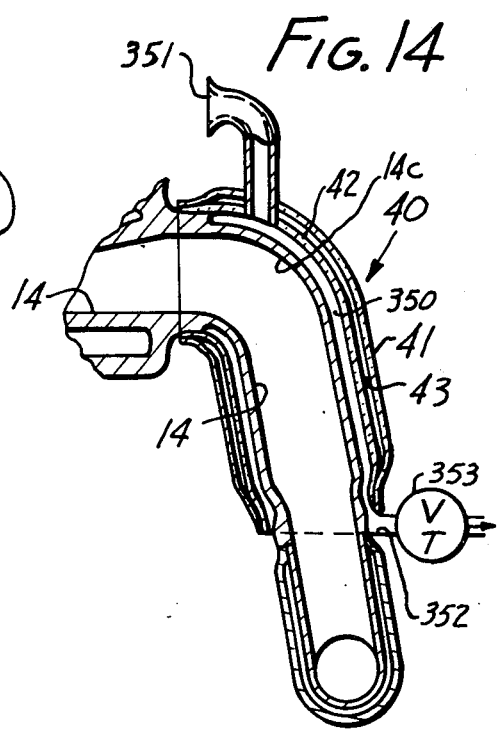
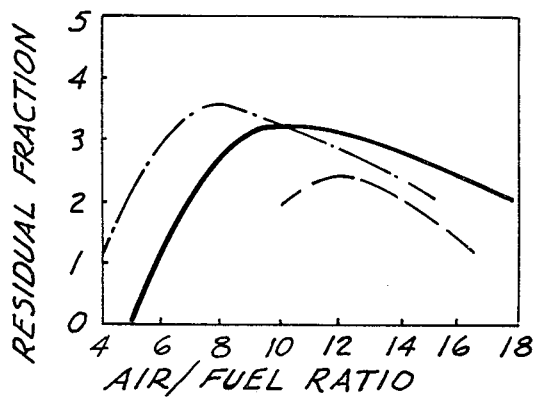

INTERNAL COMBUSTION ENGINE AND METHOD OF OPERATING IT

CROSS-REFERENCE TO OTHER PATENT APPLICATIONS

This is a continuation of applicants' co-pending U.S. Pat. application, Ser. No. 496,142, filed Aug. 12, 1974, now abandoned which in turn is a division of applicants' co-pending U.S. patent application, Ser. No. 496,141, filed Aug. 12, 1974 now abandoned.

This invention relates to internal combustion engines, and to methods and means to operate said engines so they will emit pollutants only in minimal and acceptable concentrations and quantities.

The emission of pollutants as a consequence of the operation of internal combustion engines has become a matter of serious societal concern. Increasingly stringent restrictions and being imposed upon these emissions, and the need is pressing for engines which can meet the new standards. The best solution will be one which can use substantial amounts of existing technology and tooling, and can be adapted to engines of current design without requiring radical modification. Solutions which involve radical redesigns and extreme changes in engine concepts and constructions are likely to be less effective because of resistance to change by purchasers and by persons who must learn to make and to service the new mechanisms. Accordingly, delays and inefficiencies can be anticipated when major departures from existing technologies are required.

It is an object of this invention to provide a solution for the problem of emission of pollutants, which can utilize a considerable amount of existing technology, and which requires only relatively small changes and redesigns when incorporated in many or even most conventional internal combustion engines. Other conventional engines may require more extensive modifications which, however, are clearly understandable and simple to put into usage. Therefore, they may be expected to give rise only to minimal resistance to their usage. Accordingly, this invention offers a readily acceptable solution to the problem of pollutant emissions, and one which can be adopted with minimal adversity.

It is an object of this invention to provide internal combustion engines, and methods of operating the same, whereby to minimize the emission of pollutants, especially carbon monoxide (CO), unburned hydrocarbons (generically referred to herein as "HC"), and oxides of nitrogen (generically referred to as "NOx"). Tests which have been made on engines incorporating some of the features of this invention show that in 1974, standards contemplated for 1977 automobiles can be met.

Fundamental to this invention is the fact that the emissions of the three pollutants of immediate concern, namely CO, HC and NOx, can all be minimized by operating an internal combustion engine with an air/fuel mixture ratio which is leaner than the stoichiometric ratio. A "stoichiometric mixture" is one in which, when the combustion is completed as far as the limiting substance (fuel or oxygen) permits, there will be neither excess oxygen nor excess fuel remaining. The numerical value of the "stoichiometric ratio" when gasoline is consumed is about 15; that is, the carburetor passed about 15 formula weights of air for every formula weight of gasoline introduced into the air stream. The term "fuel" as used herein means gasoline and similar liquid hydrocarbon fuels. Leaner mixtures have a relatively larger numerical value of their air/fuel ratio and have excess oxygen. "Lean mixtures" are here defined as mixtures with an air/fuel ratio greater than the stoichiometric. The term "ratio" is sometimes used interchangeably with its numerical value. In contrast, richer mixtures have a relatively smaller air/fuel ratio. "Rich mixtures" are here defined as mixtures with an air/fuel ratio lesser than stoichiometric. There is insufficient oxygen in a rich mixture to consume all of its fuel. Richer mixtures are wasteful of fuel, and tend to cause the emission of CO and of unburned HC.

While it is economically and environmentally desirable to operate an engine on lean mixtures, it has not heretofore been practical to do so at all engine conditions. It is presently feasible to operate an engine at constant load on lean mixtures at relatively high load conditions, but not at relatively low load conditions. Thus, no existing engine known to the inventors has been able to operate on lean mixtures at both low and high load conditions. Full advantage could not be taken of the opportunity to minimize pollutant emission by operation on lean mixtures. It is now possible.

Frequent reference is made herein to "low load" and "high load" conditions. By way of definition and example, in the operation of conventional internal combustion engines at low load conditions, the throttle will tend to be nearly closed, and the intake manifold pressure is usually significantly lower than atmospheric pressure. This is commonly called a "high vacuum". It occurs at idling and when a vehicle is coasting (two examples of low load conditions), as well as at other conditions where only a relatively small demand is made on the engine for power. In contrast, a "high load" condition involves a relatively open throttle, and may represent travel on a level road at a high velocity, or operation against substantial resistance, such as climbing a hill. When the throttle is open under high load conditions, the intake manifold pressure tends to rise toward atmospheric pressure. This condition is commonly called "low vacuum".

While the line of demarcation between low load and high load conditions is a broad and continuous band, still in every conventional internal combustion engine there is a condition characterized by a sufficiently low intake manifold pressure (a sufficiently closed throttle) where the engine operates roughly if at all, and misfires, when supplied with a lean mixture, whereas it will operate satisfactorily on the same mixture with a high intake manifold pressure (a sufficiently open throttle). The former condition is defined as a low load condition, and the latter is defined as a high load condition. The power actually produced by an engine at low load or high load conditions may vary. The terms are intended to relate to ranges of operating conditions wherein the said misfiring is likelier to occur. Any mixture, lean or rich, tends to be less ignitible at low load conditions, but the problem is more severe when lean mixtures are used. In conventional engine operation, the problems of low load operation are frequently corrected by enriching the mixture at the carburetor. While this smooths out the engine operation, it causes impermissibly high pollutant emissions.

The principal problem involved in operating an internal combustion engine at low load conditions on lean mixtures is the phenomenon of "misfiring". It is an impermissible condition. The term "misfiring" as used herein means that an air/fuel mixture compressed in the cylinder fails to ignite properly, or at all. As a consequence, there is substantial loss of engine power, roughness of engine operation, and a high emission of pollutants when misfiring occurs. By this invention, means is provided for operating an engine without misfiring on lean mixtures at low load conditions, where this has not heretofore been practicable. Lean operation has heretofore been feasible only at high load conditions. Therefore, this invention enables an internal combustion engine to utilize lean mixtures under both low and high load conditions, thereby to emit minimal pollutants under all operating conditions.

It is an optional objective of the invention to incorporate means to enable relatively lean mixtures also to be used when the engine is cold and starting up, thereby reducing pollutant emissions to an acceptable level during starting operations subsequent to the actual cranking of the engine.

The tendency of an engine to misfire is directly related to the numerical value of a mathematical expression hereinafter called the "residual fraction". The "residual fraction" is defined as follows:

$$\text{Residual fraction} = \frac{\text{Amount of residual gases remaining in combustion chamber from previous cycle}}{\text{Amount of air (or air/fuel mixture) taken into combustion chamber for next cycle} + \text{Amount of residual gases remaining in combustion chamber from previous cycle}}$$

The term "amount" refers to weight, or to volume measured at like temperature and pressure. As the numerical value of the residual fraction decreases, so also does the tendency of the engine to misfire. Accordingly, it is an object of this invention to provide means and method to tend to maintain (sometimes referred to as "establish") conditions in the engine such that the numerical value of the residual fraction is low enough that, in constant load operation, misfiring is substantially averted at low load conditions.

It is evident that the numerical value of the residual fraction can be reduced in either one or both of two ways: (1) by reducing the amount of residual gases remaining in the combustion chamber (the numerator in the fraction), or (2) by increasing the amount of air (or air/fuel mixture) taken into the combustion chamber for the next cycle (an additive part of the denominator). By the use of either technique, the numerical value of the residual fraction will be reduced. The result of maintaining conditions in the engine such that the numerical value is sufficiently low will be to permit an internal combustion engine to operate on lean mixtures at low load conditions, where operation on lean mixtures has heretofore been infeasible. As a consequence, engines which have many conventional features can be operated with the use of this invention at both low and high load conditions on lean mixtures, thereby to reduce pollutant emission to acceptable levels. Furthermore, provisions can optionally be made to operate the engine during starting and warm-up on relatively leaner mixtures than are conventionally used to start and to warm up a cold engine.

By definition, a lean mixture has relatively less fuel per unit volume of air than a rich mixture. Operation on lean mixtures, especially at low load conditions, requires that the fuel be as well-vaporized, and that the air/fuel mixture be as homogeneous and uniform (well-mixed), as possible. A principal difficulty in maintaining a homogeneous and uniform charge is the tendency of some of the fuel in the charge, especially at low load conditions where the air flow is slower, to collect on the wall of the intake pipes or manifold. In prior art arrangements, this film releases from the wall in droplets of substantial and varying size and at irregular intervals. The charge therefore becomes non-uniform, and the fuel in it is poorly atomized. It is an object of this invention to provide a system operating on a lean mixture with an optimally vaporized and homogeneous charge, by returning the fuel which forms this film to the mixture in a well-vaporized condition.

An internal combustion engine in which this invention is useful includes a combustion chamber, induction means for introducing a charge to said combustion chamber, and exhaust means for exhausting spent charge from said combustion chamber. According to a feature of this invention, means is provided for constituting in said induction means an air/fuel charge which is leaner than stoichiometric with the possible exceptions of starting and warm-up operations, and leaner than stoichiometric, stoichiometric, or nearly stoichiometric, at starting and warm-up operations, and also means is provided for tending to maintain the numerical value of the residual fraction during operation of such an engine at low load conditions at a value to avoid misfiring.

According to a preferred but optional feature of the invention, said last-named means comprises a throttle set at a position where at low load conditions, if the ignition means were set for the engine to operate at its maximum rpm (revolutions per minute) for that throttle setting, the engine would operate at a higher than desired velocity, and the said ignition means is retarded with the throttle maintained at the said setting, whereby to reduce the speed to a desired rpm. This tends both to reduce the residual gases and to increase the amount of charge introduced for the next cycle. Both of these effects tend to reduce the numerical value of the residual fraction.

According to another preferred but optional feature of the invention, said last-named means constitutes adjustability of the relative timing of the opening of the intake and exhaust valves for the purpose of adjusting the duration of their overlap, i.e., the time period when both valves are open at and near the end of the exhaust stroke of the piston. Shortening the overlap period tends to reduce the amount of residual gases which remains in the combustion chamber, and thereby tends to reduce the numerical value of the residual fraction.

According to an optional feature of the invention, when said last-named means is used in combination with an engine having one throttle for every combustion chamber, each throttle discharging into a respective intake pipe, and in which some exhaust gas is recirculated to the combustion chambers thereby interconnecting said intake pipes to each other through the recirculation system, means is provided in said recirculation system to isolate the intake pipes from one another. This isolation means prevents or limits the lowering of pressure in any of the intake pipes as the consequence of a lower pressure that may exist in another intake pipe. The advantages of exhaust gas recirculation in lessening emission of NOx is thereby attained in this engine arrangement without increasing the numerical value of the residual fraction.

According to still another preferred but optional feature of the invention, means is provided to vaporize fuel deposited on the intake manifold wall as a film, either by collecting it and introducing it again into the air stream, or by evaporating it with heat.

According to still another preferred but optional feature of the invention, a starting circuit is provided to supply a relatively lean air/fuel mixture to the engine when the engine is being started and is running cold.

The above and other features of this invention will be fully understood from the following detailed description and the accompanying drawings, in which:

FIG. 1 is generalized graph showing the output of certain pollutants versus the air/fuel ratio on which an engine is operated;

FIG. 2 is a top view of one embodiment of the invention with some parts removed for clarity of disclosure;

FIG. 3 is a partial cross-section taken at line 3—3 of FIG. 2;

FIG. 4 is a partial cross-section taken at line 4—4 of FIG. 2;

Figure 5:
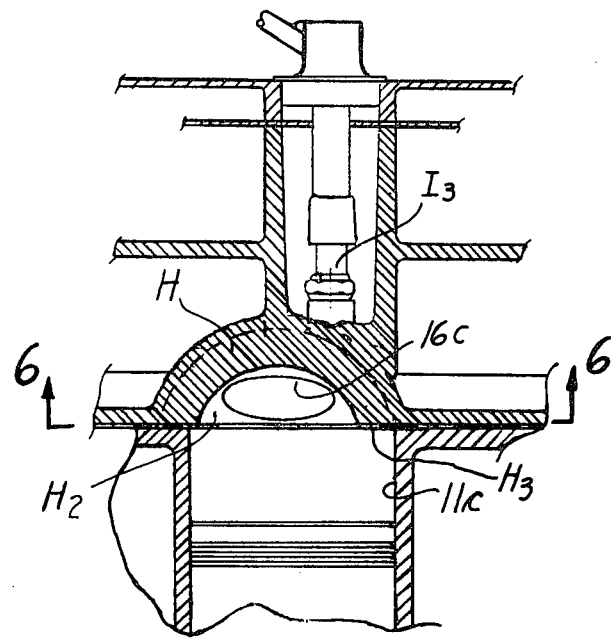
Figure 6:
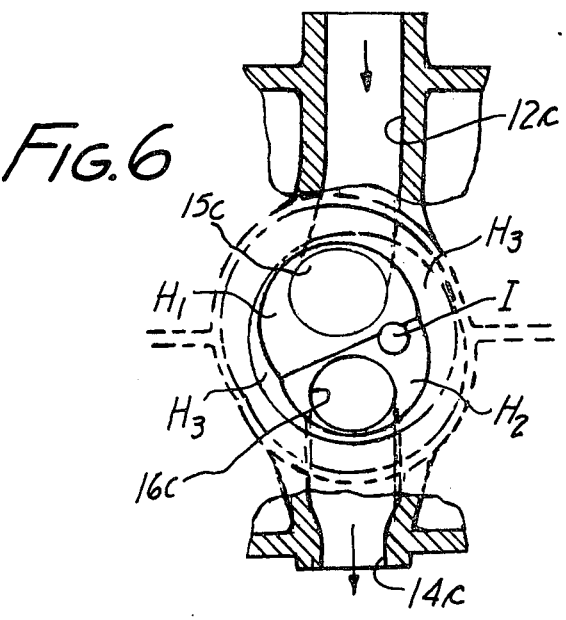
Figure 7:
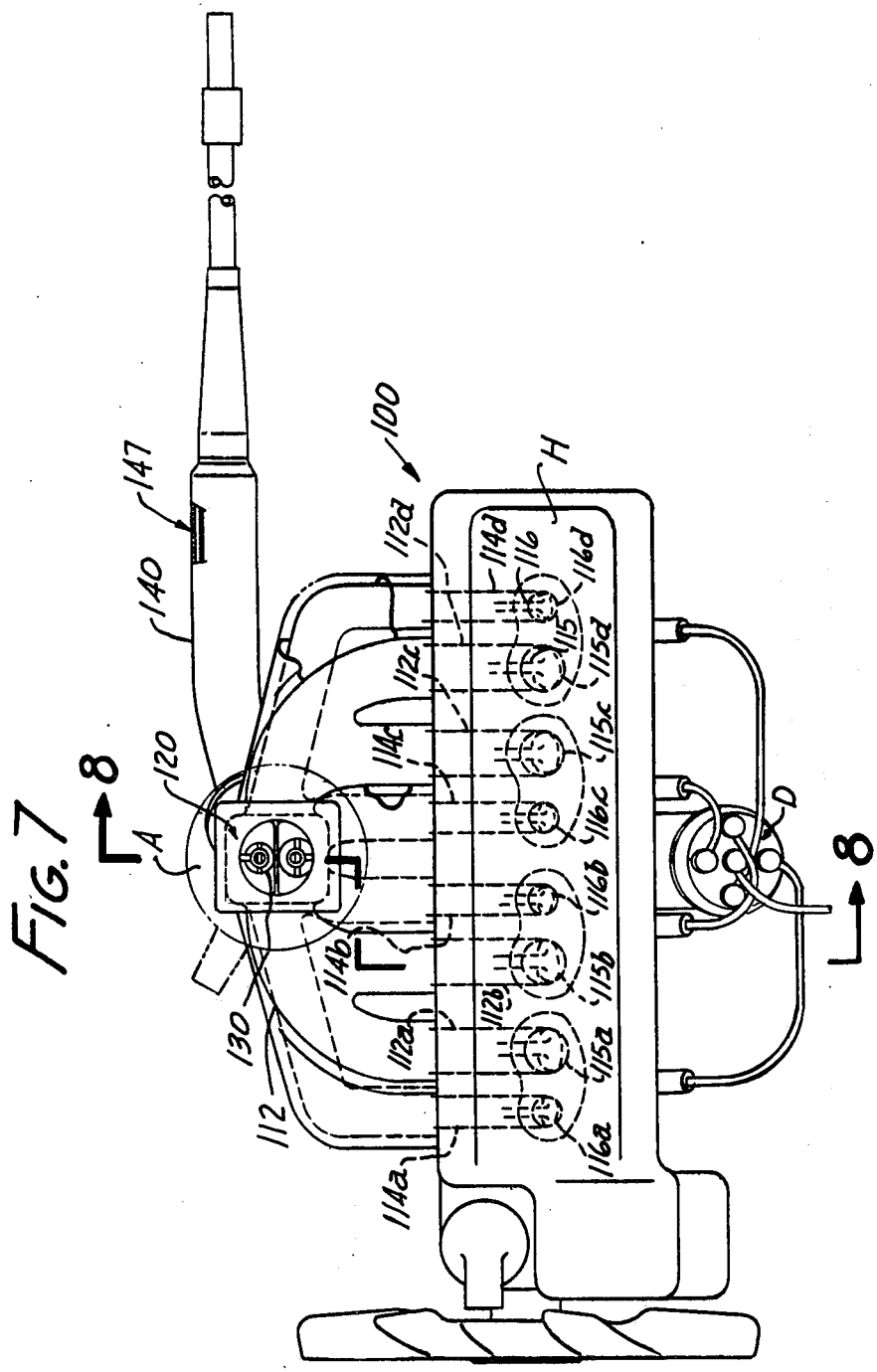
Figure 8:
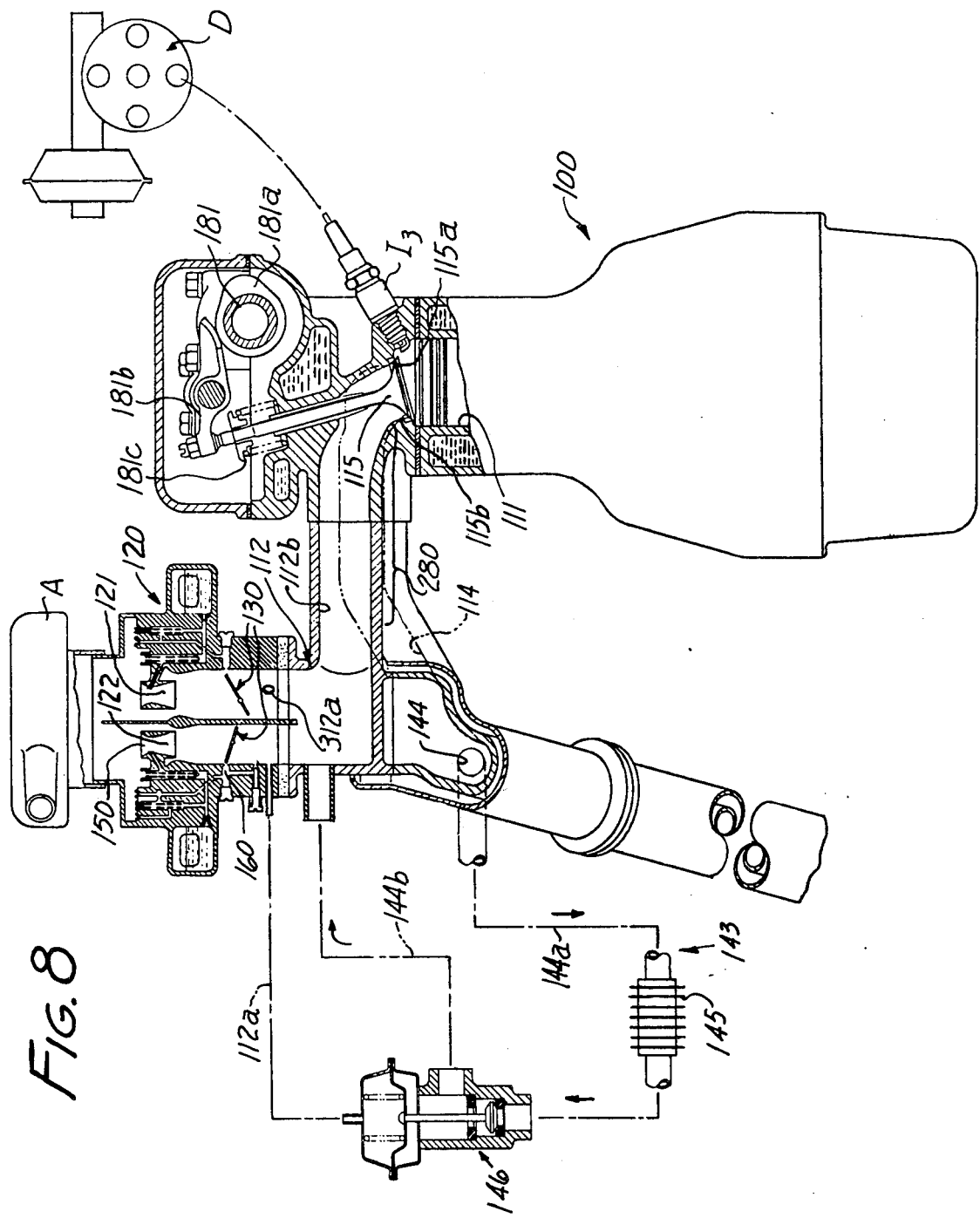
Figure 16:
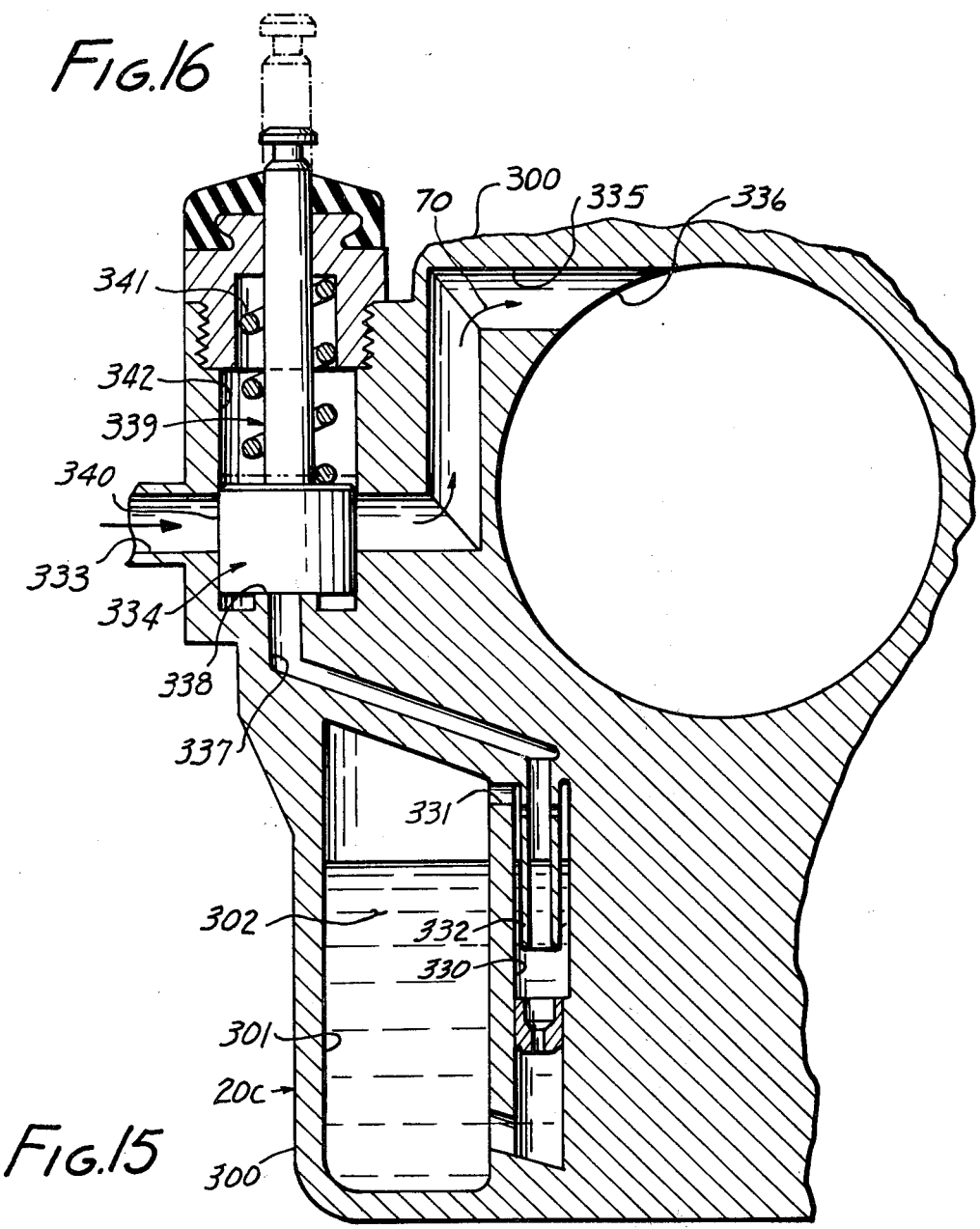
Figure 15:
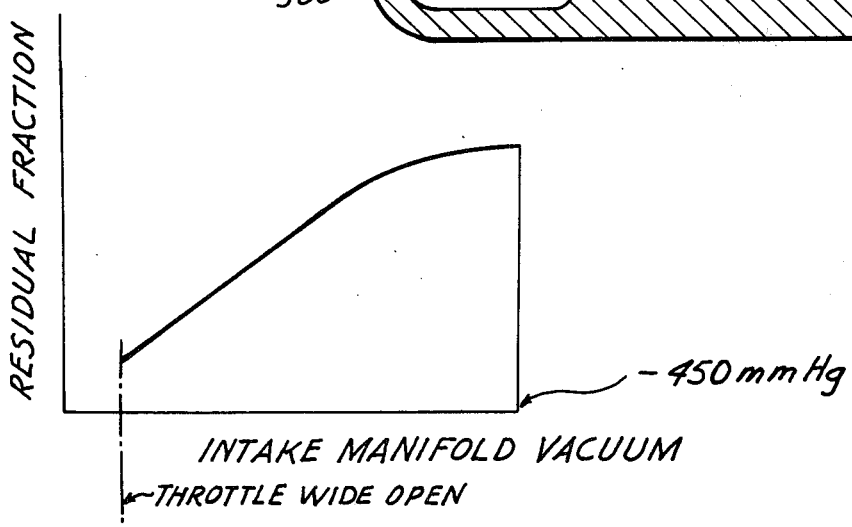
Figure 17:
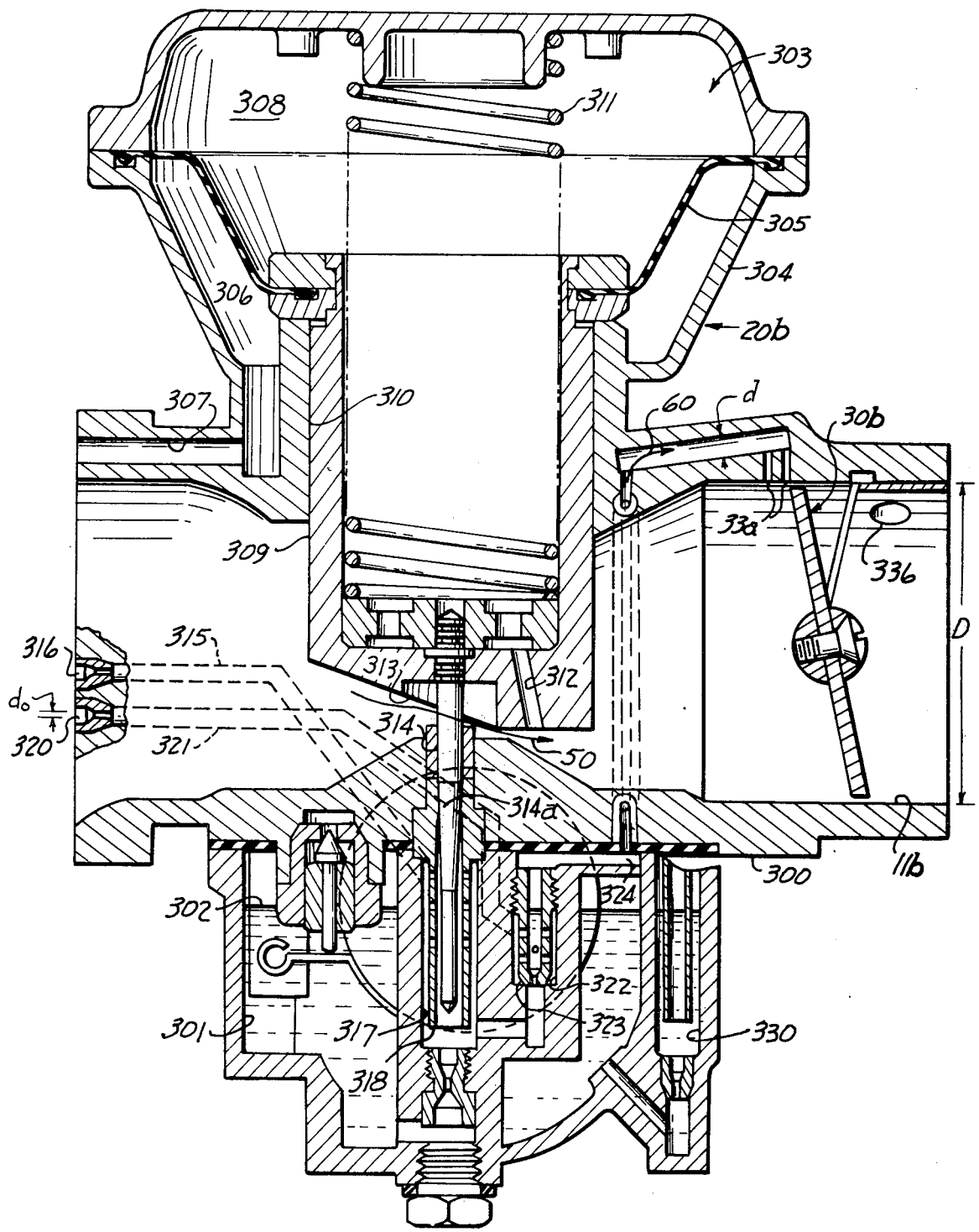
Figure 18:
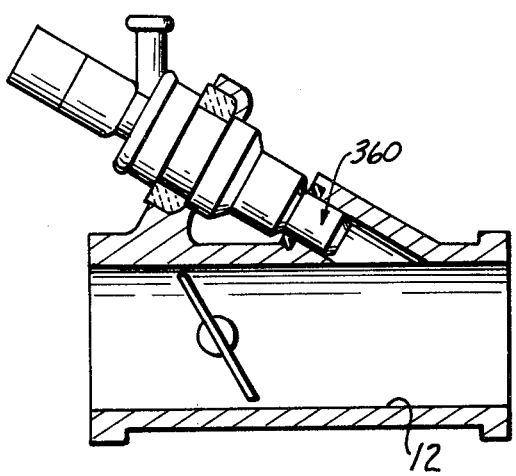

FIGS. 5 and 6 are fragmentary cross-section views showing portions of FIG. 4 taken at lines 5—5 of FIG. 4 and 6—6 of FIG. 5, respectively;

FIG. 7 is a top view of the presently preferred embodiment of the invention, partly in schematic notation;

FIG. 8 is a cross-section, partly in schematic notation, taken at line 8—8 of FIG. 7;

FIG. 9 is a schematic illustration, partly in circuit notation and partly in schematic mechanical notation, showing the ignition control circuit utilized in the engine of FIG. 7;

FIG. 10 is a generalized graph showing the relationship between the residual fraction and the air/fuel ratio;

FIG. 11 is an axial cross-section of a portion of FIG. 2;

FIG. 12 is a cross-section taken at line 12—12 of FIG. 11;

FIG. 13 is a fragmentary enlarged cross-section of a portion of FIG. 11;

FIG. 14 is a fragmentary oblique view of a portion of FIG. 4;

FIG. 15 is a generalized graph showing the relationship between the residual fraction and the intake manifold vacuum;

FIG. 16 is a cross-section semi-schematically showing a carburetor starting circuit;

FIG. 17 is an enlarged cross-section of the carburetor shown in FIG. 4;

FIG. 18 is a semi-schematic showing of fuel injector means which may be used instead of a carburetor;

FIGS. 19, 20, 21 and 22 are fragmentary cross-sections, partly in schematic notation, showing portions of the system of FIG. 2;

FIGS. 23, 24 and 25 are schematic showings of two possible conditions of fluid flow through carburetor passages; and FIG. 26 is a cross-section of an inlet pipe illustrating certain considerations pertinent to this invention.

FIG. 1 is a generalized, undimensioned showing of the emission of pollutants emitted plotted as the ordinate, versus the air/fuel ratio of the mixture which is burned in the engine plotted as the abscissa. This graph is generally true of all internal combustion engines. In addition to the pollutants CO, HC and NOx, the unobjectionable gases carbon dioxide ($CO_2$) and oxygen ($O_2$) present in the exhaust gases are shown.

FIG. 1 shows that when mixtures leaner than stoichiometric (about 15 for gasoline) are burned in an engine, HC and CO emissions decrease dramatically compared to those which are emitted as the consequence of burning a richer mixture. This observation is also true of the emission of oxides of nitrogen when mixtures with a ratio greater than about 16 are burned. It is therefore a considerable advantage to operate the engine with air/fuel mixtures whose air/fuel ratios are leaner than stoichiometric, and which preferably are in the range between about 16 to 20, in order to minimize the emission of these pollutants.

As heretofore stated, the operation of an engine on lean mixtures at high load conditions with a relatively open throttle is routinely practiced. However, for operation at low load conditions, it is customary to enrich the mixture and thereby to provide a mixture having a ratio less than stoichiometric. The adverse effects of burning the richer mixtures are evident from an examination of FIG. 1. The emissions of the pollutants HC and CO increase markedly and unacceptably. It is a significant advantage of this invention that it enables leaner mixtures to be utilized under low load conditions in addition to utilizing them at high loads, thereby securing the low emission advantages of operation with lean mixtures for both conditions.

Further by way of orientation, reference is made to FIG. 10, wherein the residual fraction is plotted as the ordinate, versus the air/fuel ratio of the mixture consumed as the abscissa. The lines in this graph represent theoretical boundary lines delineating misfiring conditions for several different engines. Engine operation with residual fractions and air/fuel ratios wherein the intersection of the coordinates lie below the respective line will not involve substantial misfiring. If the intersection of the coordinates lies above the respective line, there will be objectionable misfiring. It is evident that when operating the engine at lean air/fuel ratios, it is necessary to establish conditions in the engine whereby the residual fraction is less than some numerical value which is determined by the parameters of the individual engine. It is an object of this invention to avoid misfire limits schematically set forth in FIG. 10. This is accomplished by operating the engine in such manner that there is an acceptable value of the residual fraction, and by supplying the lean charge in an optimally vaporized and homogeneous condition.

In FIG. 15, the relationship is plotted between the residual fraction and the intake manifold vacuum pressure for one representative conventional engine which is not fitted out and operated in accordance with this invention. This graph is generally representative of conditions in such internal combustion engines. Two points on the abscissa are identified as a wide-open throttle condition (nearly atmospheric pressure) and as a condition where the intake manifold vacuum is about −450mm Hg. This graph shows that the residual fraction tends to increase with an increase in the manifold vacuum (lower intake manifold pressure). Means is provided by this invention to oppose the tendency of the residual fraction to increase with the closure of the throttle, thereby to make operation on lean mixtures possible at low load conditions.

FIGS. 2-6 illustrate one embodiment of the invention. A four-cycle internal combustion engine 10 includes four combustion chambers 11a, 11b, 11c and 11d. The term "cylinder" is sometimes used synonymously with the term "combustion chamber". This engine is provided with one throttle 30a, 30b, 30c and 30d and with one carburetor 20a, 20b, 20c and 20d for each of the combustion chambers. Individual intake pipes 12a, 12b, 12c and 12d communicate respectively with the intake ports 15a, 15b, 15c, and 15d of respective combustion chambers 11a, 11b, 11c, and 11d. The intake pipes constitute one embodiment of "induction means" used in the invention to supply a charge to the combustion chamber.

Exhaust pipes 14a, 14b, 14c, and 14d respectively communicate with and receive exhaust gases from exhaust ports 16a, 16b, 16c, and 16d from combustion chambers 11a, 11b, 11c and 11d. The exhaust pipes and an exhaust system P which collects gases from the pipes comprise one embodiment of "exhaust means" used in the invention to remove spent charge from the combustion chambers.

Exhaust gas recirculation pipes 13a, 13b, 13c, 13d are respectively connected to intake pipes 12a, 12b, 12c and 12d. Pipes 13a–d in turn are connected to an exhaust gas recirculation valve V. Vacuum line 12e (FIGS. 2 and 4) interconnects port 12f in intake pipe 12b and port 12g in control valve V. Intake pipes 12a, 12c and 12d are not connected to port 12g. Exhaust gas recirculation pipes are used when NOx is to be controlled by the recirculation of part of the exhaust gases into the incoming air/fuel mixture.

Attention is now directed to FIG. 4 where there are shown in more complete detail certain features of FIG. 2, especially those parts which are directly related to combustion chamber 11b. The other cylinders and their provisions are identical, and this is exemplary of all of them. Therefore, the others will not be individually described.

An intake valve seat 18 surrounds intake valve port 15b. Exhaust valve seat 18a surrounds exhaust valve port 16b. Intake valve 21 and exhaust valve 22 are slidably mounted in the cylinder head and are adapted to move against the respective valve seat to close the port, or to move away from the seat to open it. Cams 81a and 82a, fixed respectively to cam shafts 81 and 82, are provided to open the valve ports, and the valves are spring-loaded to close when the cams do not hold them open. Similar sets of intake and exhaust valves and seats, and cam means and return springs, are provided for each of the combustion chambers.

Cylinder head H of combustion chamber 11b is shown, together with a cooling water jacket C. Cooling jacket C shrouds only the exhaust pipe adjacent to the outlet port and the combustion chamber itself. A region 17 which extends from inlet valve seat 18 upstream into the inlet pipes is not cooled by the cooling jacket C. Instead, it is permitted to become heated by heat from the combustion chamber for purposes yet to be described. This region may even be externally insulated or heat-jacketed to increase or maintain elevated temperature.

Region 17 preferably extends at least for a distance of about 60 to 70mm upstream from the intake valve seat toward the intake pipe, and is regarded as part of the intake pipe, even though all or a portion of it may be formed integrally with the cylinder head. Region 17 is bounded by the intake wall 19 of the intake pipe, and the wall is thermally continuous with the cylinder head, i.e., the inside wall of the intake pipe is heated by heat conducted to it from the combustion chamber dome. The "dome" is the portion of the cylinder head that closes the upper end of the cylinder. This enables the internal wall 19 of region 17 to warm up, and it is not appreciably cooled by cooling means such as jacket C. Any cooling means is sufficiently spaced from the region 17 that the wall 19 can operate at the necessary temperatures as the consequence of heat conducted to it from the cylinder. A portion $C_1$ of the jacket is shown in FIG. 4 in the cylinder head above the intake port. In liquid-cooled engines, the cooling passages should extend to this side of the head, but it is not desired for them to cool the said region. Accordingly, there is a sufficient thickness of material between portion $C_1$ of the cooling jacket and wall 19 that enough heat is conducted to wall 19 to warm it sufficiently, despite the presence of portion $C_1$. Region 17 is one embodiment of "vaporizing means" for vaporizing liquid fuel which may have collected on the wall of the inlet pipe.

An ignition distributor 23 is schematically shown in FIG. 2. Conventional condensors, breaker points, cams, and cam shaft, are utilized to provide a spark to ignite the mixture in the combustion chamber. The entire ignition system of FIG. 9 may be utilized in this engine embodiment if a throttle setting described therewith is also used. An ignition system for usage in FIG. 2 need not include certain ignition-retarding means utilized in FIG. 9 when the said throttle setting is not used.

Exhaust gas recirculation valve V includes a plunger 200 which is biased by a spring 201, and is attached to a diaphragm 202 that is mounted to the wall of a body 203. Body 203 forms a vented chamber 204 and a vacuum chamber 205. The bias spring tends to move the plunger to the elevated position as shown in solid line in FIG. 4 and in FIG. 21. Exertion of vacuum in the vacuum chamber 204 will move the plunger downwardly. When the plunger moves downwardly by a sufficient distance (FIG. 22), it will reduce or close off entirely the flow of gases from inlet 206, from which the flow would otherwise be distributed through four outlet ports 207 to recirculation pipes 13a–d. It follows that the amount of recirculation of gases yet to be described will be a function of the degree of vacuum in inlet pipe 12b.

The principle advantage of providing one throttle per combustion chamber is that the pressure in one intake pipe is not reduced by the pressure in another intake pipe. In engines where one intake manifold and throttle supply a plurality of combustion chambers, the lower pressure in a combustion chamber on its intake stroke may adversely affect the pressure at the intake port of a different combustion chamber. The usage of one throttle per combustion chamber allows each combustion chamber to set its own intake conditions. However, recirculation pipes 13a–d do interconnect all of the inlet pipes, and as such could tend to equalize their pressures, thereby reducing some of the values otherwise attainable by the usage of one throttle per combustion chamber.

Figure 19:
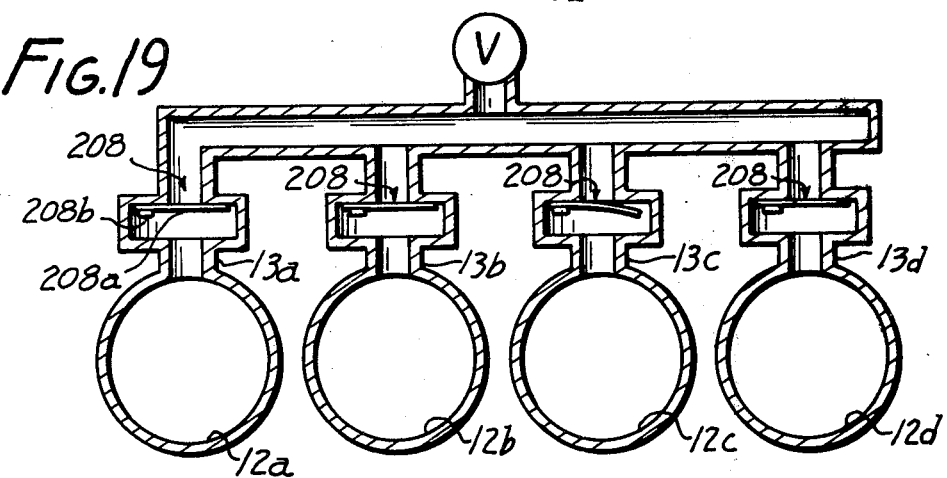

To avoid this adverse result, isolation means is provided in the respective recirculation pipes. In FIG. 19 this isolation means comprises unidirectional check valves 208. As examples, reed valves are shown, which constitute flexible blades 208a mounted to a chamber wall by a fastener 208b, each of which blades tends to close its respective recirculation pipe except in response to differential pressure sufficient to deflect it. One of the valves in intake pipe 12c is shown deflected by a sufficient differential pressure. All can be open at once when there is a sufficient pressure from valve V. However, when a sufficiently large negative pressure exists in the line from valve V, perhaps from one of the intake pipes at a high vacuum (12c in FIG. 19), the other valves will close as illustrated.

Figure 20:
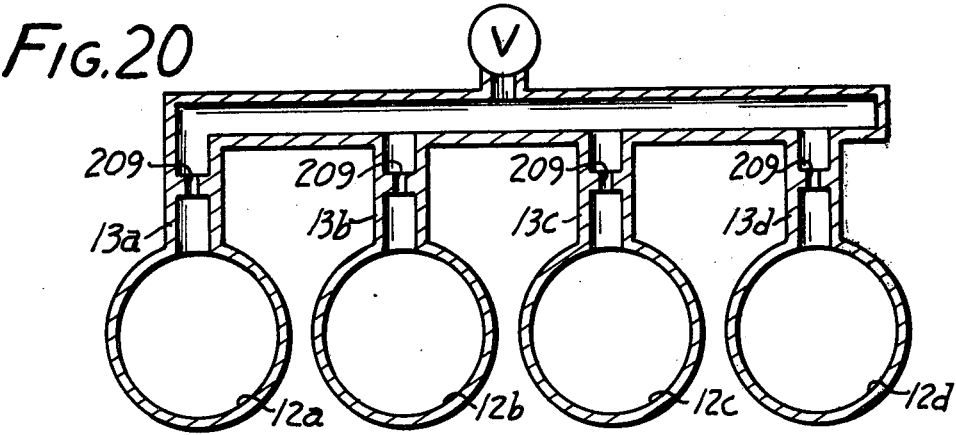
Figure 21:
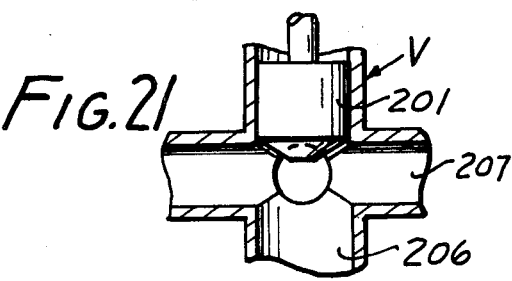

In FIG. 20, the isolation means comprises orifices 209 of sufficiently small bore as to restrict the flow of gases in response to short pressure peaks, but which are large enough to permit the more gradual flow of recirculated exhaust gases.

A piston 150 is reciprocably fitted in each combustion chamber. The piston turns the crankshaft through a conventional wrist-pin, rod and crank arrangement (not shown).

As best shown in FIG. 3, the pair of cam shafts 81, 82 is rotationally mounted to the block to turn cams 81a and 82a for the purpose of actuating intake valves 21 and exhaust valves 22, respectively. The cam shafts extend parallel to each other. They are adapted to be driven by cam shaft sprockets 81b and 82b, which are pinned to respective cam shafts 81 and 82, in the direction of the arrows shown on them by means of a timing chain 85. A cam shaft sprocket 84 is coaxially secured to a drive-sprocket 86 which in turn is driven by a chain 83 that is in turn driven by a sprocket 87 keyed to crankshaft 88. This train will drive the cam shafts in synchronization with the crankshaft.

The timing chain 85 slides over a guide member 210 which is rigidly attached to the engine block by means of fasteners 211. A chain tensioner 215 is pivotally mounted to the block by a pin 216. It includes a guide plate 217 over which the chain slides. Guide plate 217 can move pivotally in the directions shown by arrows 218. It is biased toward the chain by a plunger 219 which projects from a case 220 that is mounted to a wall 221 of the block. A compression bias spring 222 in the case backs up the plunger and forces the plunger to the right in FIG. 3. The second guide member thereby comprises yieldable bias means tending to maintain the length 223 of the timing chain between cam shafts 81 and 82 at its minimum length.

When length 223 is at its minimum, there is a specific angular relationship between shafts 81 and 82 that represents minimum valve overlap and is used for low load conditions. "Valve overlap selecting means" 225 comprises a fluid force device 90 for selectively changing this angular relationship by increasing length 223, and extending the valve overlap for high load conditions. Device 90 includes a plunger 91 which is reciprocable in a cylinder 92. A bias spring 93 in compression between the plunger and the frame lightly presses the end 91a of the plunger against the chain without sufficient force to deflect the length from its illustrated minimum-length path. The cylinder is mounted to the cover or frame of the engine by means of fasteners 226. Plunger 219 yields to enable the portion of timing chain between sprockets 81b and 84 to shorten and thereby to supply the additional chain required for length 223 to elongate.

When the plunger 91 is forcibly to be depressed, thereby to enlongate length 223 and to change the angular orientation between shafts 81 and 82 (increasing the overlap), fluid pressure (preferably hydraulic) is introduced into cylinder 92. This is accomplished by means of a hydraulic system 94 which includes a reservoir 94a, a hydraulic pump 95, an off-on valve 96, which can be used to disable the hydraulic system, and a selector valve 97 which is controlled by actuator 97a.

Actuator 97a for controlling selector valve 97 is preferably mechanically responsive to a throttle linkage yet to be described. Alternatively, it may constitute a pressure-responsive device that is responsive to manifold pressure. The hydraulic system is shown in JIC notation. It can selectively either pressurize the cylinder 92 by applying hydraulic pressure to it through conduit 97b, or vent the cylinder by way of vent 97c while bypassing hydraulic pressure through bypass conduit 97d. The hydraulic system will be provided with a conventional pressure relief valve (not shown) to maintain system pressure at some predetermined value when cylinder 92 is pressurized. The actuator selects the valving condition in response to throttle position. Thus, there is provided means for providing two different angular orientations between cam shafts 81 and 82, depending on whether or not pressure is applied to cylinder 92, and this is dependent upon the existence of a low load or a high load condition in the engine.

Each carburetor 20a-d, inclusive (see FIGS. 2, 4 and 17), includes a high load circuit 50, a low load circuit 60, and a starting circuit 70 (see FIG. 16). Circuits 50 and 60 supply air/fuel emulsions which, when mixed with air passed by the throttle, will provide a lean mixture to the combustion chamber of the correct ratio. Starting circuit 70 also supplies a lean air/fuel mixture, but the mixture ratio is supplies may have a lesser numerical value than the mixtures supplied by circuits 50 and 60, so that when the engine begins its warm-up after being started by cranking, the combined mixture from the starting circuit and from the low load circuit might average about stoichiometric. When only air/fuel mixture from circuit 70 is used to start the engine, its output will be leaner (about 14:1). This is compared to the very rich mixtures (perhaps (8:1) provided by choked engines. While 14:1 is richer than stoichiometric, it is "nearly stoichiometric". If it is to be combined with air passed by a throttle, the emission from circuit 70 will be made richer than if said additional air were not provided, so the resulting mixture is appropriately constituted.

Throttle valve means 30a-d (of which throttle valve means 30c is exemplary) includes a throttle shaft 31 (FIGS. 4, 11, 12 and 17) rotatably supported in the wall of the intake pipe or manifold. It includes a disc 32 secured to the shaft 31, which disc acts as a butterfly valve when the shaft is turned. A throttle arm 32a is pinned to the shaft and connected to the accelerator (not shown). Rotating the arm as a lever will rotate the shaft and adjust the position of the valve disc in the pipe so as to vary the area of the pipe which is open to flow of fluid therethrough. The angular position of arm 32a relative to the disc is adjustable. The throttle is shown substantially closed in FIG. 11.

Carburetor 20c (FIG. 17), which is typical of all of the carburetors used on the engine of FIG. 2, includes a carburetor body 300 with a bowl 301 containing fuel 302. The high load circuit 50 is comprised of an actuator 303 which includes a casing 304 which has a diaphragm 305 extending across it to divide the casing into a vented chamber 306 vented to atmosphere by vent passage 307, and a vacuum chamber 308. A plunger 309 is slidably fitted in passage 310, and is biased downwardly by spring 311. Vacuum passage 312 passes through the bottom of the plunger and opens into vacuum chamber 308. It also opens into throat 313 of the carburetor.

A tapered metering pin 314 is attached to and projects axially from the lower end of the plunger. It fits in metering orifice 314a, and its axial position determines the effective opening of orifice 314a. The amount of fuel passed through the orifice is therefore a function of both the pressure in the throat, and of the axial position of the metering pin in metering orifice 314a. The higher the plunger 309 is in FIGS. 4 and 17, the more open is the metering orifice. A high load bleed conduit 315 extends from an inlet orifice 316 in the inlet to the carburetor to a chamber 317 in communication with the bowl. A perforated open-ended tube 318 (sometimes called an "emulsion tube") contains fuel from the bowl. The fuel is moved through the metering orifice as a consequence of air flow under pressure through bleed conduit 315 and of low pressure in the throat. Air flowing from the bleed conduit mixes with fuel and transports it as a very rich mixture (sometimes called an "air/fuel emulsion") through the remainder of this circuit. The foregoing portion of the carburetor constitutes means to introduce fuel into the air, and comprises a high load circuit which supplies fuel at high load conditions.

The low load circuit 60 includes another bleed orifice 320 and bleed conduit 321. Bleed conduit 321 discharges into a chamber 322 in the bowl, which also contains fuel from the bowl. The chamber encloses a perforated open-ended tube 323 (also sometimes called an "emulsion tube") from which fuel is discharged through a discharge conduit 324 as a consequence of the flow of air from bleed conduit 321, and as a consequence of low pressure in discharge conduit 324 communicated from the region near the throttle. As in the high load circuit, the air from the bleed conduit mixes with fuel and transports it as a mixture (sometimes called an "air/fuel emulsion") through the remainder of this circuit. Conduit 324 discharges into the intake pipe through entry ports 33a. The low load circuit provides the lesser amount of fuel required for operation at low load conditions, and also contributes to the supply of fuel at high load conditions.

The operation of the high and low load circuits is well known by persons skilled in the art. The high load circuit can discharge directly into the throat, where the fast-moving air stream will vaporize and optimally mix it. The low load circuit provides for some mixing and vaporizing to occur in conduit 324, and discharges into a region close to the throttle where the best available vaporizing and mixing conditions exist under conditions of lesser total air flow. In both cases, the output from the circuits mixes with additional air which passes the throttle to form a properly-proportioned lean mixture which is supplied to the combustion chamber. The air/fuel ratio of the mixture which is supplied to the combustion chamber is preferably between about 16 and about 20.

Entry ports 33a are placed at the top of the inlet pipe adjacent to the position occupied by the upper edge of the throttle disc when the throttle is slightly open. There may be, and usually will be, more than one of the entry ports 33a axially spaced apart along the inlet pipe, and some may even be well upstream from that location.

The foregoing carburetor is well known in the trade as an SU type carburetor with a slow speed circuit.

Some pertinent details of starting circuit 70 are shown in FIG. 16. Chamber 330 in the carburetor body receives air from the vented carburetor bowl through conduit 331. A perforated, open-ended tube 332 (sometimes called an "emulsion tube" with the same properties as the emulsion tubes of circuits 50 and 60) holds fuel, also from the bowl, which is mixed with air received from conduit 331. The fuel also is aspirated by suction. Air passage 333 enters the body from a region upstream of the throttle valve, and extends toward starter valve 334. An extension 335 of passage 336 enters the intake pipes 12a–d and discharges into the intake pipe at entry port 336. Fuel, together with some entrained air (an air/fuel emulsion), is withdrawn from the bowl by aspiration through fuel passage 337, which terminates at a starter valve seat 338.

Starter valve 334 includes said seat 338 and a plunger 339. The plunger includes a head 340 which is biased by spring 341 toward the seat. The seat is closed by the head unless the plunger is lifted upwardly. The head also closes air passage 333 when the plunger closes the seat.

While the engine is cranked, the throttle is usually kept closed. A conventional starter is energized to crank the engine, and a handle (not shown) is pulled so as to lift the plunger to the position shown in dashed line in FIG. 16. The head is moved up into recess 342. This permits air to flow through passage 333. Fuel is aspirated through fuel passage 337, and the air and fuel mix in extension 335. The mixture is well-atomized and discharges as a uniform charge into the inlet pipe from entry port 336 downstream from the throttle. The plunger is held open after the engine has caught and the throttle opened, and is kept open until the engine is warm enough that it will run well on the mixture supplied by the low load circuit. During this warm-up period, which usually takes about 20 seconds, the engine will be drawing air/fuel mixture from both the starting and from the low load circuits. After the engine is warm, perhaps about 20° C. or higher, the plunger will be released and the starting circuit will be disabled.

The mixture supplied to the combustion chamber when the starting circuit is used is frequently not made as lean as the mixtures supplied at low and high load conditions when the engine is warm and the starting circuit is disabled. Instead, the mixture used at starting and warm-up resulting from the combined output of the starting and low load circuits will preferably have a lean, a stoichiometric, or a nearly stoichiometric value air/fuel ratio between about 14 and 16, because the mixture supplied by the starting circuit may be considerably richer, and when the engine is being cranked over, rather little air is drawn past the throttle to dilute it. This range extends on both sides of the stoichiometric ratio. However, this represents a very lean mixture when contrasted with the mixture ratios of 8 or 9 which result from choking a standard carburetor. Furthermore, this leaner mixture stays in its relatively leaner range while the motor is warming up, and does not remain or become overly rich, as is the tendency when manual or automatic chokes are used, while the engine is warming up.

The starting circuit produces a relatively leaner mixture which can fuel the engine because by using a separate starting circuit for providing the air/fuel mixture, a well-atomized and uniform mixture can be provided by this circuit. This is especially important during initial starting while cranking, and also while the engine is warming up, because the wall of the intake manifold will not yet have warmed up to a temperature at which fuel that may readily separate out of the mixture in such a slow-moving stream will be vaporized by it.

It is an unfortunate tendency for some of the fuel from the low load circuit to deposit as a film on the wall of the pipe adjacent to and downstream from the outlet. This circuit is primarily of importance at low load conditions when the volume and average velocity of air through the pipe is reduced. "Vaporizing means" is provided to return that fuel to the air/fuel mixture stream.

One such "vaporizing means" is a film intercept means 33 formed in the wall of the intake pipe downstream from the entry ports 33a of the low speed circuit 60 (FIG. 11). A film of fuel which is deposited on the wall of the intake pipe tends to flow toward a groove 33b downstream of entry port 33a as a consequence of friction drag exerted on it by air flowing through the pipe.

Groove 33b is formed in the upper region of the intake pipe, and extends somewhat less than 180° around it. The plane of the groove is tilted toward the shaft 31. A partial sleeve 34 is attached to the upper portion of the inner wall of the intake pipe and partially covers the groove 33b so as partially to shroud the same. The sleeve serves to retain fuel which flows into the groove. Liquid fuel in the groove will then flow downwardly in the groove toward the ends of shaft 31. Deflector members 35 and 36 are attached to the disc adjacent to the ends of the shaft. Surfaces 35a, 36a extend from near the shaft ends to near the lower midpoint of the disc.

Liquid fuel from the groove flows out of the groove at its ends and onto surfaces 35a and 36a. The surfaces conduct the fluid downwardly and inwardly, and the fuel drops from the surfaces into the path of the air passing under the disc. Flow of air is very swift (nearly sonic) near the bottom of the disc, and the liquid is swiftly caught up in the air stream and transported by it.

Another such "vaporizing means" constitutes the region 17 of the intake pipe adjacent to the intake valve seat. The wall 19 of this region is operated at an elevated temperature. The wall of this region should be maintained at a temperature between about 90° C. and 135° C. In liquid-cooled engines, a temperature of 110° C. appears to give optimum results. A film of gasoline will be vaporized at these temperatures. The temperature should not be so high that the entire charge will be heated, because this would be a disadvantage. Wall temperatures between about 90° C. and 135° C. appear to avert this adverse result. Either one of the two vaporizing means (the warm wall 19, and the groove) may be used alone to advantage. Both can be used together to good advantage.

The term "vaporizing" is used to denote the transfer of the liquid into the stream of air/fuel mixture. The term does not necessarily mean that the fuel has been converted to a gas. Indeed, much of the fuel in the mixture is in the form of small-sized droplets of liquid, perhaps surrounded by gas, and the stream will of course include some gas from the lower-boiling point constituents of the fuel. The term "vaporizing" is used in the broad sense of the removal of a liquid from a surface, and its reintroduction into the stream of mixture. The film intercept means primarily attends to fuel film downstream from the entry ports 33a. The heated wall primarily attends to film in excess of the capacity of the groove to accommodate (if any), and of liquid which might condense on or otherwise deposit on the wall by impingement against it. It may be that this heated region functions to discourage deposition, as well as to convert it to a gas. The transport mechanism or mechanisms involved is immaterial in the definition of the term "vaporizing means".

When an aluminum cylinder having a bore of about 70 to 90mm is used, an axial length of uncooled region 17 about 60–70mm long is useful. A thickness of cylinder head contiguous to the inlet pipe or manifold of about 13 to 15mm is useful. The wall thickness of region 17 should not be less than about 6mm. Attention is called to the fact that the usual head thickness of a conventional cylinder is on the order of only about 9mm, and the wall thickness of the intake pipe only about 4mm. The greater thickness, especially of the combustion chamber dome in this invention provides for ready conduction of heat to region 17 and isolates the region from any cooling jacket which may be used.

The arrangement for the warmed wall shown in both FIGS. 2 and 7 will operate at temperatures in the desired range without insulation or jacketing. However, insulation could be provided at this region. Also, the region could be jacketed and warmed with hot exhaust gases, if desired or necessary.

As best shown in FIG. 4, each intake pipe communicates with its respective cylinder. This arrangement is also shown in FIGS. 5 and 6, wherein additional details of a preferred cylinder head H are shown. Two hemispherical walls $H_1$, $H_2$ are included, and one of the valve ports is disposed in each. A squish zone $H_3$ is formed around the outer boundary. The squish zone is a flat shelf which faces toward the piston, and the piston approaches it very closely when the piston is at top dead center.

Squish zones are well known in the engine art. When the piston approaches the squish zone, fluid between them is forced ("squished") out from between them, and this causes a desirable turbulence of the charge in the cylinder.

Flame propagation in lean mixtures is less stable, and ignition is less reliable, than flame propagation and mixture ignition in rich mixtures. Means which can improve the flame propagation and the ignition of a lean mixture will also tend to improve the drivability of the vehicle, as well as its fuel economy. It has been found that the usage of a squish zone, and of a pair of hemispherical regions in the cylinder head, do in fact materially improve the flame propagation.

The respective spark plugs $I_1$, $I_2$, $I_3$ and $I_4$ are positioned in the vicinity of the borderline between the hemispherical walls $H_1$ and $H_2$ of the respective cylinders.

HC emissions can be reduced by the use of a thermal reactor 40 which receives the exhaust gases from the exhaust ports and holds them long enough at an elevated temperature for the HC to be oxidized by oxygen which remains in the exhaust gases. Such a reactor when used forms part of the exhaust means. A suitable thermal reactor is best shown in FIGS. 2, 4 and 14. It comprises an outer casing 41 around an enlarged portion of each of the exhaust pipes 14 and an inner casing 42 between them. A space 43 is formed between the casings. This space 43 may be filled with solid insulating material, or may simply be filled with air to serve as insulation. Space 43 and whatever is in it serves as insulating means to keep the reactor hot by retaining its heat.

A ventilating sleeve 350 is formed between the outer wall of the enlarged portion of the exhaust pipes and the inner casing, whereby to form a means for cooling the exhaust pipe. The ventilating sleeve is a means to prevent the reactor from overheating.

An air scoop 351 receives air which is channeled into the ventilating sleeve. The ventilating sleeve includes an outlet 352, flow through which is controlled by a thermally-sensitive and thermally-responsive outlet valve 353. A valve controlled by a bi-metallic element exposed to reactor temperatures is an example of such a valve. The thermally-responsive valve permits more air to flow through the ventilating sleeve when the reactor temperature is higher than when it is lower. Accordingly, it tends to maintain the reactor at a suitable temperature.

For the purpose of suppressing NOx formation, exhaust gases are withdrawn from the reactor through a port 44 (FIG. 4) and passed through a cooler 45, thence to an exhaust gas control valve 46, and finally through conduit 44b to exhaust gas recirculation valve V. A conventional exhaust gas control valve 46 includes a diaphragm-actuated plunger 46b, whose movement is the consequence of vacuum applied above a diaphragm 46a and received from pipe 12e. When the manifold pressure is appropriate, valve 46 is opened to recirculate some of the exhaust gases through pipe 44b to the inlet of valve V, and thence to the inlet pipe.

The embodiment of FIGS. 7-9 will now be described. The principal difference between this embodiment and the embodiment of FIGS. 2-6 is that in the embodiment of FIGS. 7-9, there is only one throttle for controlling the flow of air to a plurality of combustion chambers, while in FIGS. 2-6, there is one throttle for each combustion chamber. The consequences of this difference are discussed elsewhere.

In FIGS. 7-9 there is shown a four-stroke internal combustion engine 100 with four combustion chambers 111a, 111b, 111c, 111d. All of the combustion chambers are alike, and therefore only combustion chamber 111b is shown in detail. Intake and exhaust valves 115, 116, respectively, are reciprocably fitted in the cylinder head so as to be movable toward and against a respective intake valve seat or exhaust valve seat 115a, 116a, respectively, to close a respective intake valve port or exhaust port 115b, 116b, and to be movable away from the valve seats to open the respective ports.

A cam shaft 181 is shown in FIG. 8 which bears cams 181a, one for each valve (eight in the example—one for each of the valves) to open them by means of conventional rocker arm assemblies 181b. Return springs 181c close the valves when they are not opened by the cams. Only one cam shaft is provided in this embodiment, and the cams are appropriately placed along and around it.

A carburetor 120, best shown in FIG. 8, includes a pair of conventional barrels 121, 122 which discharge air/fuel mixture toward a throttle means 130 downstream. Barrel 121 provides, along with the fuel conduitry it controls, a high load circuit to supply fuel to the air at high load conditions, and barrel 122 provides, with the fuel conduitry it controls, a low load circuit to supply fuel to the air at low load conditions. It usually supplies fuel at high load conditions also. Each of these circuits supplies a lean mixture, preferably in the range of ratios between about 16 to 20. Throttle means 130 includes a throttle for each barrel, but these throttles are coordinated, and are both common to the same plurality of combustion chambers. They are therefore referred to as a single throttle.

The illustrated carburetor is completely conventional and requires no further detailed description here. Its function is identical to that of carburetor 20. It receives air from an air cleaner A and discharges a metered quantity of fuel into the air flow through the barrrels to form an air/fuel mixture which enters intake manifold 112. The intake manifold in turn discharges air/fuel mixture to the intake ports of each of the combustion chambers through inlet pipes 112a, b, c and d. Inlet pipes 112a, b, c and d are branches of the manifold which connect to the respective combustion chambers.

The carburetor also includes a starting circuit 70 of the type shown in FIG. 16, and it is used for the same purpose and in the same way. It is therefore not shown in FIG. 8. Mixture from the starting circuit discharges into the intake manifold through an entry port 312a downstream from the throttle. The starting circuit operates in this embodiment the same as it does in FIG. 2.

Exhaust pipes 114a, b, c and d connect to the exhaust ports, receive exhaust gases (sometimes called a "spent charge") from them, and discharge them to an exhaust system 147 which includes a thermal reactor 140 identical to thermal reactor 40.

A region 280, similar in construction, purpose and operation to region 17, is also provided adjacent to each intake port to vaporize liquid fuel which contacts it. It is not jacketed or cooled, and operates in the same temperature range and for the same purpose as region 17. It is located adjacent to and extends into the intake manifold from the intake valve seat. The film-collecting groove is not ordinarily used to dispose of films in a manifold with a down-draft carburetor, because there is not the same kind of localized film effect adjacent to an entry port as is the situation in the side-draft carburetor of FIG. 2. However, it may advantageously be used downstream from a side-draft carburetor in a single intake pipe which later divides, or expands into a single manifold, and supplies a plurality of combustion chambers from one carburetor. In a manifold arrangement such as shown in FIG. 7, a region 280 adjacent to each intake port is often adequate to vaporize liquid which impinges on it, or flows as a film onto it.

Exhaust recirculation means 143 for minimizing NOx is similar to that which is utilized in FIGS. 2-6. This means withdraws exhaust gas from reactor 140 through a port 144. The gas flows through pipe 144a, through a cooling means 145, through an exhaust gas recirculation valve 146, and through pipe 144b to the intake manifold. Valve 146 is controlled by vacuum exerted through conduit 112a which connects to the intake manifold adjacent to and just downstream from the throttle. Because all of the intake ports are in fluid communication through the manifold, isolation means such as shown in FIGS. 19 and 20 is not provided. Also, this system does not include a valve such as valve V.

In this embodiment, means is provided for retarding the ignition (delaying the spark) under low load conditions (FIG. 9). The ignition system comprises a conventional breaker assembly mounted on a rotary plate 240 which is adapted to be rotated in a frame 241 by means of a controller 242. The controller includes a rod 243, one end of which is pinned by pin 244 to the rotary plate. Its other end is attached to a diaphragm 245, which diaphragm is contained in a casing 246 that forms two chambers: a vacuum chamber 247 and a vented chamber 248. A bias spring 249 biases the diaphragm, and therefore the rod, downwardly in FIG. 9. Exertion of vacuum in chamber 247 will cause the shaft to move upwardly in FIG. 9. Vacuum conduit 250 interconnects vacuum chamber 247 with the intake manifold so that, as the vacuum increases, i.e., as pressure decreases, in the intake manifold, the rod will rise, turning the breaker plate counterclockwise, and change the time of opening a set of breaker points by changing the position of the points relative to a cam shaft which carries and rotates a cam for the purpose. This will have the effect of retarding the ignition. Higher manifold pressures will cause a reverse action and will advance the ignition.

The distributor illustrated in FIG. 9 differs from the conventional arrangement described above and useful in the engine of FIGS. 2-6 by the inclusion of both a conventional first set 251 of points and a unique second set 252 of points. The first set 251 is to cause ignition at high load conditions (and is used for all load conditions in FIGS. 2-6). The second set 252 is for use in the engine of FIGS. 7-9 to cause ignition at low load conditions. The operation of the breaker plate assembly, when used without the second set of points, or when operated under high load conditions when only the first set of points is relied on to cause ignition, is in accordance with standard practice and is responsive to manifold pressure as described above.

The illustrated construction provides selectible ignition-retarding means 255, the objective of which is to make the second set of points 252 effective to cause the spark plugs to ignite the mixture in the combustion chambers at low load conditions, instead of the first set. The second set is located on the plate at an angular spacing relative to the first set which represents a retardation or delay in ignition relative to the first set of approximately 10° to 15°. That is, cam 256, which functions to open the second set of points, opens them at a later moment that it opens the first set. The amount of retardation is a function of the physical angular spacing-apart of the two sets of points on the rotary plate. However, in the circuitry shown there is an overlap period in which both sets are simultaneously open. The first set always opens and closes first, and the second set opens after the first set opens, but before it closes.

A typical cam 256 on cam shaft 257 is shown for opening the points and thereby breaking the circuit, all as well known in the prior art. Cam shaft 257 is timed to the crankshaft and driven by it.

The ignition circuitry is itself conventional. One terminal of a battery 260 is connected to ground 261. The other battery terminal is connected to ignition switch 262. The ignition switch is in turn connected to conventional induction coil 263, one of whose terminals is connected to rotor 264 of the distributor. The distributor includes four contacts labeled 1, 2, 3, 4, corresponding to the spark plugs in the cylinders which are to be fired. In turn, these contacts are connected to respective spark plugs $I_1$-$I_4$, as shown, which in turn are grounded at ground 266.

The selectible ignition-retarding means 255 includes a normally closed (spring-loaded to closure) throttle switch 270 which is connected to arm 271 attached to the throttle valve 130. The illustrated linkage will cause simultaneous rotation of the throttle valve and of switch plate 272. When the throttle is closed or nearly closed (low load conditions) as in FIG. 9, the linkage will have rotated switch plate 272 to press a post 272a downwardly and open the switch by separating contacts 272b, 272c. Contact 272b is mounted to a springy mount 272d. Opening the throttle under high load conditions will rotate switch plate 272 clockwise, and switch 270 will close as a consequence of the mount's tendency to return to the closed position.

Throttle switch 270 is grounded at ground 273, and its other terminal is connected to a relay 274 at one terminal of its winding 275. The other terminal of winding 275 is connected to a terminal of the battery. In turn, the relay includes a switch member 276 with a pair of selectible terminals 277, 278 and a common terminal 279. The first set 251 of points is connected to common terminal 279. The second set 252 of points is connected to terminal 278. Terminal 277 is not connected to any circuitry. Switch member 276 is spring-loaded normally to make contact with terminal 278. When winding 275 is energized, switch member 276 makes contact with terminal 277 instead.

When the throttle valve is substantially closed, which is typical for a low load condition, switch 270 will be open, and the relay will be unactuated. It is shown in its normal unactivated position illustrated in FIG. 9, wherein the first set of points is disconnected, and the second set of points is connected and active through the common terminal. The effect of this will be to utilize the second set of points under low load conditions to fire the spark plugs. This retards the ignition relative to what would have been the timing of firing the spark plugs if set 251 had been used instead. Even though both sets of points are connected in the circuit, only the second set is effective at low load conditions. This is because when the first set opens, the second set is still closed, and grounds the circuit. It is not until the second set also opens that ignition occurs. Of course, this requires that the physical arrangement of the two sets include a condition wherein the first set is already open when the second set opens. Other circuit and point configurations can readily be devised to provide the same function. In whatever arrangement, the ignition condition is either retarded or not retarded by selection of which set of points is effective to ignite the charge, and this depends in turn upon the position of the throttle valve.

When the throttle is opened, typical of a high load condition, then throttle switch 270 will be closed, relay 274 will be energized, and the switch member will interconnect terminals 277 and 279. This disconnects the second set of points, and the first set is effective for ignition. This provides an advanced ignition condition.

In the embodiment of FIGS. 7-9, the intake valve 115 begins to move away from its seat and open the intake valve port before the exhaust valve 116 closes by a crank angle of between about 20°-80° (overlap). This adjustment optimizes the amount of the residual combustion gases for high load operation of the engine. Thus, the engine is set for best operation at high load conditions. Now if the throttle were closed to slow down the engine, misfiring would result, because the value of the residual fraction would rise with a diminution of air flow, and there is no means in this engine to change the valve overlap. This tendency of the value of the residual fraction to rise must be opposed. Because the amount of residual gas is not controllable (overlap not being variable in this embodiment), the remedy is to increase the mass flow of incoming gases and, as a consequence, to reduce the numerical value of the residual fraction.

This is accomplished by a unique combination of throttle and ignition settings as follows. Throttle 130 is set at an open position at low load conditions such that, if ignition timing were advanced, the engine would speed up (the relative angular position of arm 271 and throttle 130 is adjustable). However, with the throttle held at that set position, and with the engine operating at low load conditions, the ignition is retarded to slow it down to an acceptably low speed. This may be regarded also as retarding the ignition to reduce the speed, and opening the throttle to maintain it. By opening the throttle, the intake manifold pressure is increased, the differential pressure between the intake manifold and exhaust manifold pressure is decreased, and the tendency of the residual fraction to increase is reversed. By way of explanation of the last statement, it is observed that, when the differential pressure between the manifold pressures increases, i.e., when the intake manifold pressure decreases, then when the valves are both open, the flow of new mixture into the combustion chamber is decreased because of the decrease in the differential pressure between the intake and exhaust pipes. This tends to increase the residual gases, as well as to decrease the amount of new gases. By means of this invention, opening the throttle increases the intake manifold pressure, and decreases the differential pressure, thereby counteracting this effect, optimizing the removal of residual gases, and increasing the amount of new charge supplied to the combustion chamber. The mass flow is thereby maximized by opening the throttle. What would have resulted in an increase in engine speed is averted by using the set of points which delays the ignition. Accordingly, the numerical value of the residual fraction is reduced under low load conditions to a value at which the engine can operate without misfiring. The foregoing presupposes operation with an engine whose carburetor receives air at ambient pressure.

At high load conditions, the ignition is fired by the first set of points. This advances the ignition relative to the other retarded selection which is used only at low load conditions, and enables the engine to operate at the higher speeds with best economy.

FIG. 18 illustrates a fuel injector nozzle 360 discharging into any one of inlet pipes 12a-d, or into intake manifold 112. It supplies an atomized stream of fuel to the air stream passed by the throttle. It may operate continuously, especially in a manifold which supplies more than one combustion chamber, or it may be pulsed, to deliver a burst of fuel at intervals, especially in a system where each nozzle supplies only one combustion chamber. In the latter situation, it is best practice for the fuel stream not to arrive at the intake port when both valves are open (overlap). In a practical system, this is accomplished by stopping the flow of fuel from the injector nozzle for the period extending between about 30° through about 150° after top dead center in the intake stroke. The term "fuel injection" as used in this specification means only injection into an intake pipe or manifold upstream from the intake port of the respective combustion chamber. It excludes the injection of fuel directly into a combustion chamber.

The pertinence of the foregoing mechanical arrangements and methods to the objectives of the invention may better be perceived by reviewing at this point some of the conditions in a cylinder during the conclusion of the exhaust stroke and the start of the intake stroke. The pressure in the exhaust manifold tends to approach atmospheric (ambient), because it is a sensibly large conduit. The pressure in the intake pipe or manifold downstream from the carburetor varies, and depends primarily on the throttle setting. Upstream of the carburetor, of course, it approaches, or is at, ambient pressure.

When one throttle is used to supply only one cylinder, and the throttle is open to flow for high load conditions, the intake pipe pressure at the intake port approaches atmospheric. Near the end of the exhaust stroke and before top dead center, it is customary to open the intake port while the exhaust port is still open. This is called valve "overlap". The tendency of gases in the cylinder to exit through the exhaust port during the resulting valve overlap period will be greater the higher the manifold pressure. If the manifold pressure is relatively lower, then there is a significant differential pressure which will tend to discourage the exhaust of gases, and it may even cause some residual gas to flow in a reverse direction into the inlet pipe. Accordingly, the longer the period of overlap, or the lower the manifold pressure, the greater will be the amount of residual gas in the combustion chamber for the next cycle.

When there is only one combustion chamber per throttle, and the inlet pipes are not interconnected, then each inlet pipe operates at a pressure determined only by its own conditions. However, if the inlet pipes are interconnected such as directly through NOx recirculation pipes, or if more than one combustion chamber intake port communicates directly with one throttle, then a lower pressure which may exist at one intake port can be communicated to the intake port of another combustion chamber, thereby to lower its inlet pressure, or to lower the average pressure in the manifold. This can result in an increase in the differential pressure between intake and exhaust during valve overlap, and increase the residual gases as described in the paragraph next above.

The use of one throttle per combustion chamber with the inlet pipes isolated from one another optimizes conditions at overlap in such an engine so as to reduce the amount of residual gases. This is because no combustion chamber reduces the inlet pipe pressure of another. When exhaust gas recirculation is employed, and the pressure of one inlet pipe could affect the pressure of another, isolation means such as those in FIGS. 19 and 20 is used to prevent it. Therefore, the material improvements attainable by the usage of one throttle per combustion chamber can be attained while still providing exhaust gas recirculation to reduce NOx.

Both in engines where there is only one combustion chamber per throttle, and where there is more than one, the residual gases increase with the period of overlap. Reduction of overlap by means of variable valve timing will result in a lesser amount of residual gases, and provide means and method for reducing the numerical value of the residual fraction.

Another means to reduce the said numerical value is to raise the inlet pressure. This can be done by opening the throttle wider, and compensating for the expected increase in engine speed by retarding the ignition. The raising of the inlet pressure by this means has the same effect on the differential pressure as was described above.

All of the foregoing techniques are useful in enabling an engine to operate at low load conditions on lean mixtures. The isolation means finds its usage exclusively on engines which have only one cylinder per throttle. The variable valve overlap technique and the open throttle-retarded ignition technique are useful in both types of engines, and may be used singly or together. Therefore, the fact that one is shown in FIG. 2 and the other in FIG. 6 does not infer that they cannot both be used simultaneously. For example, in the system of FIG. 2 the entire ignition means of FIG. 9 can be used. One or more of the throttles would be opened wider, and the ignition retarded at low load conditions, just as described for the system of FIGS. 7-9.

The foregoing criteria relate to the means for limiting the numerical value of the residual fraction. Utilizing these criteria in equipping and operating an engine enables a lean mixture to be consumed during both low and high load conditions. However, this presupposes that the lean mixture itself is uniform and homogeneous and that the fuel in it is optimally vaporized. Otherwise, the variations in mixture consistency and ratio from portion to portion of the charge might frustrate the successful operation of the engine on lean mixtures, especially under low load conditions.

FIG. 26 illustrates some of the criteria involved in providing a homogeneous and uniform mixture to the combustion chambers, in which the fuel is suitably vaporized. Arrows 400 illustrate a stream of air/fuel emulsion entering an intake pipe 12 from entry ports 33a. This is a stream of finely-divided droplets, together with the air from the bleed passages and gases from evaporated fuel. It is principally an atomized stream, and mixes with additional air which passes the throttle to form the said lean mixture.

Some of the fuel will collect as a film 401, and it is caught in the groove and reintroduced into the stream as aforesaid. The fuel is divided into droplets of various sizes. As shown by arrow 402, the smaller particles tend to follow a direct path to the intake port. However, as shown by arrow 403, some of the droplets, especially the larger ones, are likely to impinge on the wall of the inlet pipe, especially where it bends. These droplets might tend to adhere to the wall, and the heated region 17 corrects the situation. The two vaporizing means thereby attend to fuel which tends to separate out as a liquid, and reintroduces it to the stream at a reasonably constant rate.

A suitably homogeneous mixture is best attained when at least about 70%, and preferably about 80% of the total fuel enters the path shown by arrows 400. Much of the remainder of the fuel forms a film 401 on the bounding wall of the inlet pipe. Also, good results are attained when at least about 70% of the fuel (excluding that portion of the fuel which is in the gaseous state) entering the path shown by arrows 400 is in droplets having a diameter no greater than 0.02mm. The foregoing percentages refer to the total weight of the fuel. Such a stream readily mixes with the additional air, and the smaller particles tend to pass to the intake port without collecting as a film, or gathering to form undesirably larger droplets. It is the function of the low speed circuit to provide the stream in suitably atomized form, and in a uniform condition. While other means may be provided to supply fuel in the low load condition, conventional carburetor technology can be employed if certain criteria are kept in mind by the designer.

FIGS. 23 and 24 show a theoretical conduit 405 wherein an air stream 406 is flowing, and transporting a peripheral layer 407 of fuel and/or air/fuel emulsion. If the proportions are correctly selected relative to flow rates, the fuel will tend to flow along the wall as a uniform tubular layer in steady flow. It does not break loose from the wall at irregular times and in varying quantities, and a smooth, continuous discharge is attained. This is to be contrasted with the condition shown in FIG. 25, wherein these criteria have not been met. Then the flow of fuel is shown by section 408. The fuel moves as a stream at and near the bottom of the conduit. Its movement is less regular, and liquid tends to break loose from it at irregular intervals and in varying amounts. A person tuning such a carburetor can actually hear an irregular sound which is caused by this condition.

By whatever means it is provided (fuel injector nozzles can readily provide a fuel stream atomized as suggested above in any embodiment of the invention), if the fuel is suitably atomized and uniformly supplied by the low speed circuit, and most of the liquid fuel which reaches the wall of the intake pipe is vaporized, then a well-vaporized, homogeneous and uniform lean air/fuel mixture results which can be utilized in an internal combustion engine in accordance with this invention.

A carburetor starting circuit supplying an optimally-vaporized and uniform mixture for usage during starting and engine warm-up, while the air flow through the carburetor is relatively slow, and while the engine is not yet hot enough to assure vaporization of the fuel, also constitutes such means.

The use of a thermal reactor in which unburned hydrocarbons are consumed, and the use of squish areas and hemispherical regions in cylinder heads, respectively provide additional improvements which further reduce pollutants and improve the performance of a system according to the invention.

Bearing in mind the foregoing detailed description of the engines and theoretical discussion, the operation of the system according to the invention will now be summarized.

The engine of FIGS. 2–6 is started by cranking it with its throttles closed, the plungers of the starter circuits raised, and the starter motor energized to crank the engine. Air/fuel mixture will flow into the intake pipes from the starting circuit 70 and from them into the combustion chambers when the valve settings permit. The starting circuit may be proportioned to supply all required air/fuel mixture with the throttle closed. It will then be set to produce a mixture with the desired relatively leaner ratio. Alternately, the throttle may be set at idle, and the starting circuit is held open to enrich the idling stream, and its own output will be made quite rich so that the combined output of the low load circuit and of the starting ciruit will be richer than the lean mixture supplied with the usage of the low load circuit alone. The ignition system sequentially fires the spark plugs, the engine starts to operate, and the starter motor is de-energized. The plungers are held up so long as a mixture from the starting circuit is desired, which will usually be on the order of about 20 seconds. The somewhat richer mixture which is supplied from the starting circuit smooths out the operation of the engine while it is still cold. Also, the starting circuit mixture is more homogeneous than the mixture which reaches the intake ports from the other circuits while the engine is cold and operating at low load conditions.

Regions 17 are cold at first, but they will soon warm up, and thereafter will serve to vaporize fuel film before it can enter the combustion chamber. Also, heat in the combustion chamber serves to vaporize the fuel after the engine is warmed up. The groove also functions to return fuel to the stream. Therefore, after the engine is warm, the starting circuit is no longer required. The plungers will be released, and the starting circuit is shut off.

In the operation of both embodiments of the engine, the starting circuit can provide a lean mixture or, if desired, one which is momentarily richer than stoichiometric. Both of them are well-atomized and well-mixed, because they discharge downstream from the throttle valve and then pass directly through the respective intake pipe with minimal opportunity for the fuel to separate.

The engine of FIGS. 7-9 is started in the same way as the engine of FIGS. 2-4. It utilizes only the heated region to vaporize the film. Either one, or both, of the vaporizing means may be used in an engine with a manifold instead of a group of separate intake pipes and throttles as in FIG. 2, provided that there is a horizontal pipe just downstream of the throttle where the film can be collected and from which it can be returned to the air/fuel stream.

When the engine of FIGS. 2-6 is operated at high load conditions, wherein the throttle is substantially open and the intake pipes (sometimes called an "intake manifold") operate at relative low vacuum (relatively high intake pressure), there is little difficulty in operating the engine with a lean mixture. A substantial and desirable overlapping of the opening of the intake and exhaust valves 15 and 16 can then be permitted without resulting in misfiring, because the residual fraction decreases with increasing manifold pressure (FIG. 15). Operation with greater overlap improves fuel economy. However, under relatively low load conditions, the amount of the residual combustion gases must be decreased if lean operation is to be successful. The amount of residual gases can and will be reduced by lessening the duration of the valve overlap at low load conditions when variable valve overlap means is provided.

The condition illustrated in FIG. 3 is for starting and for a relatively low load operation. The illustrated valve overlap (determined by length 223) is at its minimum setting. This tends to decrease the numerical value of the residual fraction. This permits operation without misfiring at lower intake pressures.

When the time of opening the intake valve 15 is to be advanced with respect to the closing of the exhaust valve 16 at high load conditions, thereby to increase the overlap, the valve overlap selecting means 225 is actuated. This pushes plunger 91 against the timing chain and deflects its path. Downward movement of plunger 91 will elongate length 223 of the chain and advance the cam shaft 81 relative to cam shaft 82, thereby increasing the overlap.

When the engine is again to be operated at low load, the valve overlap selecting means is set so as to vent conduit 97d. The chain under the bias of chain tensioner 215 will return the plunger 91 to the position shown in FIG. 3, shortening length 223 and thereby reducing the overlap.

Actuator 97a may be a mechanical actuator, actuated either by a direct linkage to the throttle, such as by attachment to throttle arm 32a, so the linkage causes the two different valve settings to be made at two different throttle settings. It may instead be a pressure-sensitive actuator, actuated by manifold pressure which causes the valve settings to be made as a function of two different intake pressures. When the throttle is closed, representing low load conditions, the intake vacuum will be high, or the position of throttle 33 and the linkage will be such as to cause the valve to place the control circuit in the condition shown in FIG. 3, with conduit 97b vented. When the throttle is opened, the manifold vacuum will be lower, and the conditions will be reversed, pressurizing conduit 97b and cylinder 92, and extending the plunger to increase the overlap period of the valves. The timing of the overlap is extended by perhaps 30° to 80° for high load conditions.

Also at starting, exhaust gas recirculation valve V remains closed. This prevents or limits exhaust gas recirculation during starting. It is best practice not to recirculate exhaust gases at this time, because to do so would increase the residual fraction by recirculating some exhaust gas, and at cold and unstable conditions this could adversely affect the operation of the engine.

Figure 22:
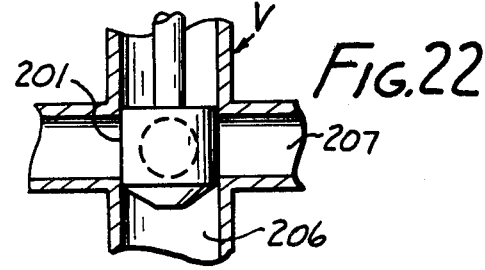

Exhaust gas control valve 46 is opened in response to reduction of vacuum within the intake pipe (increase in pressure), and the amount by which the vacuum control valve is opened is varied in accordance with the degree of this vacuum. Exhaust gases are conveyed through the exhaust port 44, conduit 44a, exhaust gas control valve 46, and pipe 44b (see FIG. 21). When insufficient vacuum is present, valve 46 is closed (FIG. 22).

It will be seen that the amount of the residual gases in the embodiment of FIGS. 2-6 is determined in part by the duration of the overlapping of the intake and exhaust valves, as well as by the amount of opening of the exhaust gas recirculation valve V (which affects the fraction by supplying residual gases to the intake pipes). The effect of controlling the overlap, as well as the limiting of recirculating exhaust gases, is to maintain at a suitable value the said residual fraction when operating under low load conditions. Valve V may either be a simple off-on valve, or may be a metering cycle valve with off-on positions as well.

In operating the engine of FIGS. 7-9 at low load conditions, a lean mixture is issued from the low load circuit of the carburetor 170, which is supplied to the combustion chambers. The same criteria of fuel flow and droplet size discussed for the carburetor in the engine of FIGS. 2-4 apply to this carburetor. The vaporization of any liquid fuel on the wall is enhanced by the heat transferred from the wall of the intake manifold 112 after it warms up. This heat is adequate to vaporize the film on the wall of the manifold at region 280, but is insufficient to heat the entire charge. As in the embodiment of FIGS. 2-6, the mixture in the combustion chamber is further evaporated by the heat of the residual combustion gases therein.

When operating the engine of FIGS. 7-9 (which does not include a provision for varying the overlap), at high load conditions, the major portion of the air/fuel mixture issues from the high speed circuit 150.

Because valve overlap adjustment is not provided in this embodiment, another type of means for maintaining the residual fraction at an acceptably low value at low load conditions is provided. This comprises the open throttle and retarded ignition means. As heretofore stated, these can both be used in the same engine, if desired.

For high load conditions, only the first set 251 of points is effective to fire the compressed charge in the combustion chamber. This is the more advanced of the two sets of points. The operation of the rotary breaker plate assembly gradually to advance and retard the ignition is in accordance with conventional operating considerations for both sets, and the usual advancement and retardation of spark with changing manifold vacuum results.

However, for low load operations, the throttle will have been set to open an amount which, if the timing were set optimally, the engine would run too fast. An ignition-retarding means effective only at low load conditions is provided to slow the engine down to a correct speed.

This selectibility of a still more retarded ignition setting for low load operation is provided by the second set 252 of points which is inherently more retarded than the other. The selection is accomplished by system 225 whose operation has already been described.

The residual fraction at low load conditions is kept to a minimum as a consequence of the higher intake pressure caused by the more open throttle setting, and the speed is maintained at a desired rpm by retarding the ignition by using the second set of points for ignition. When the load condition goes from low to high, the first set of points will again be effective to ignite the charge.

In FIGS. 7-9, recirculation of exhaust gas may be cut off at low load conditions in order to further reduce the numerical value of the residual fraction by not adding residual gases to the incoming stream under these conditions. However, this can be a gradual control, and at least some recirculation may be permitted except at the very lowest low load conditions.

Persons skilled in the engine arts will recognize that there are means other than those shown to adjust the valve overlap, and therefore the particular way of accomplishing it is not a limitation on this invention. Similarly, other means can be devised to retard the ignition at low load in the circuit of FIG. 9. These are simply presently preferred means to accomplish the objectives of the invention.

Further with regard to the absence of cooling means at regions 17 and 280, it is evident that cooling means may be relatively nearby, for example, jacket $C_1$ in FIG. 4. Alternatively, an air-cooled engine might have cooling fins nearby. But in all cases, the cooling means are sufficiently far removed, or have such limited cooling capacity, that heat conducted from the combustion chamber can still maintain the temperature of the bounding wall in the desired temperature range, at least at low load conditions, and preferably also at high load conditions.

It will also be appreciated that the actual values of suitable residual fractions will vary from one type of engine to another, and the engine designer will determine what these values are, and then make his specific designs with them in mind.

The desirable peripheral flow of fuel through the low speed circuit can reliably be attained in the carburetors shown, provided that the following certain parameters are conformed to. In FIG. 17, dimension $d_o$ is the smallest diameter of bleed orifice 320. Dimension $d$ is the maximum diameter in discharge conduit 324 between the emulsion tube 323 and entry ports 33a (entry ports 33a may have the same or smaller diameter—usually smaller). Dimension D is the diameter of the inlet pipe into which the air/fuel emulsion discharges. In the carburetor of FIG. 8, the dimensions are analogous, but are not shown in detail. Analogous dimension D is the diameter of the venturi throat into which the slow circuit 112 discharges. The bleed orifice is at the upstream end of the conduit which discharges to this throat. The analogous dimension $d_o$ is the maximum diameter of the conduit between the emulsion tube and the entry port to the throat in circuit 122.

The desirable peripheral flow shown in FIG. 24 can be expected if, in either embodiment of carburetor the ratio $d_o/D$ is in the numerical range between about 0.035 to about 0.065. When there is one throttle per combustion chamber, the ratio $d/D$ should be in the numerical range between about 0.035 and 0.100. The actual dimensions will be selected by the designer with the requirements of the engine in mind. In one typical four-cylinder engine, wherein four throttles and carburetors were used to supply four combustion chambers (one carburetor for each combustion chamber), the following dimensions produced a suitable output:

$d$ = 1.7mm dia.
$d_o$ = 1.8mm dia.
D = 38mm dia.

Should the same type of carburetor have been adapted for usage on an engine where it would have supplied a plurality of combustion chambers, the following scale formula may be applied to design a suitable low load circuit:

$$\text{dimension } d^* \text{ of the modified carburetor} = \sqrt{n(d - 1.0)^2} + 1.0$$

where $n$ is the number of cylinders supplied by this low load circuit, and $d$ is the maximum diameter of the conduit in the carburetor which supplied only one combustion chamber. "$d$" of "$d^*$" are the numerical values of the respective dimensions in millimeters, and the resulting value is expressed in millimeters.

In the foregoing example, the dimension $d^*$ of the modified carburetor would be $(2d-1.0)$ millimeters. The other dimensions are obtained by use of the foregoing ratios.

With the above ratios and criteria in mind, a person skilled in carburetion will be able to provide a low load circuit suitable for use with this invention on any engine with which he is concerned.

Also, persons skilled in the engine arts will recognize that there is advantage in regulating the operating temperature of the thermal reactor, both to provide optimum consumption of residual hydrocarbons by maintaining a temperature at which they oxidize, and to extend the life of the reactor by keeping it from overheating. Operation in the temperature range between about 550° C. and 900° C. appears to give good results.

The present invention is useful in four-stroke internal combustion engines generally. It may be used in engines having any number of cylinders, such as straight 6's and V-8's, as well as in four-cylinder engines. It also can be used with the so-called stratified intake system with auxiliary combustion chamber.

It is observed here that, while both embodiments of the vaporizing means is effective at both low and high load conditions, such means is needed less at high load conditions than at low load conditions. This is because the higher rate of air flow at high load conditions inhibits formation of the fuel film, and tends to keep the fuel from settling out. The low load carburetor circuit may or may not be used at high load conditions.

The means to minimize the numerical value of the residual fraction in both embodiments is effective and needed only at low load (and starting) conditions. In both embodiments, selectible means select unique settings for low load operation.

From the foregoing specification, it will be appreciated that the surprisingly effective results of the invention can be attained while requiring but few departures from the prior art, and in an elegantly simple system. The engine is anabled to operate on lead mixtures at low load conditions, where it was previously impracticable, by the use of means to keep the residual fraction to an acceptably small numerical value, such as variable overlap means, the usage of a throttle for each combustion chamber (preferably combined with means for varying the overlap), and a more open throttle with selectible means to retard the ignition at low load conditions. The system can be made to operate most effectively by using means to supply to the combustion chambers a suitable lean mixture. For this purpose, means such as heat means or means to collect and re-introduce a fuel film into the air stream, or both, may be used. Further advantages can be attained by adding to the system a separate starting circuit in the carburetor which is adapted to provide a more homogeneous, lean mixture than carburetors equipped with chokes.

This invention is not to be limited by the embodiments shown in the drawings and described in the description, which are given by way of example and not of limitation, but only in accordance with the scope of the appended claims.

We claim:

1. In an internal combustion engine of the type which includes a combustion chamber, induction means for introducing an air/fuel charge to said combustion chamber, and exhaust means for exhausting a spent charge from said combustion chamber, the improvement comprising: means for constituting in said induction means said air/fuel charge which is leaner than stoichiometric with the possible exceptions of starting and warm-up operations, and leaner than stoichiometric, or stoichiometric, or nearly stoichiometric, at starting and warm-up operations; and means tending to maintain the numerical value of the residual fraction at low load conditions such that the engine operates on said air/fuel charge at said low load conditions without substantial misfiring, said residual fraction being defined as follows:

$$\text{Residual fraction} = \frac{\text{Amount of residual gases remaining in combustion chamber from previous cycle}}{\text{Amount of air (or air/fuel mixture) taken into combustion chamber for next cycle} + \text{Amount of residual gases remaining in combustion chamber from previous cycle}}$$

2. Apparatus according to claim 1 in which vaporizing means is provided for vaporizing fuel introduced into the induction means to assist in providing a well-vaporized, uniform and homogeneous air/fuel mixture in said induction means.

3. Apparatus according to claim 1 in which said internal combustion engine also includes an intake valve seat, surrounding an intake port, which interconnects the combustion chamber and the induction means, an intake valve adapted to be seated on said intake valve seat to close the intake port and to be moved away from the intake valve seat to open the intake valve port, an exhaust valve seat surrounding an exhaust port which interconnects the combustion chamber and the exhaust means, an exhaust valve adapted to be seated on said exhaust valve seat to close the exhaust port and to be moved away from the exhaust valve seat to open the exhaust port, and in which means tending to maintain the numerical value comprises means for actuating the intake and the exhaust valves, and valve overlap selecting means effective selectively to vary the duration of overlap of the opening of said intake and exhaust valves, whereby to shorten the said duration when the engine operates at low load conditions, and to lengthen it when the engine operates at high load conditions.

4. Apparatus according to claim 3 in which vaporizing means is provided for vaporizing the fuel to assist in providing a well-vaporized, uniform and homogeneous air/fuel mixture.

5. Apparatus according to claim 4 in which the said engine also includes a throttle in said induction means, and the induction means includes a bounding wall and in which the means for constituting said charge comprises a carburetor low load circuit which discharges fuel into the induction means through an entry port adjacent to the throttle, and in which said vaporizing means comprises a groove in the wall of the induction means downstream from the said entry port, which groove conducts fuel collected by it to, and discharges it at, a location where the fuel re-enters the air stream adjacent to the throttle.

6. Apparatus according to claim 4 in which said vaporizing means comprises a portion of the wall of the induction means adjacent to the intake valve seat which is heated by heat conducted to it from the combustion chamber dome, whereby to provide a surface temperature sufficient to vaporize a fuel film which contacts it.

7. Apparatus according to claim 6 in which said wall portion is without cooling means which would reduce its temperature below that at which vaporization occurs.

8. Apparatus according to claim 1 in which said engine also includes a throttle in said induction means, and ignition means, and in which said means tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle position.

9. Apparatus according to claim 8 in which the ignition means includes a first set of points and a second set of points, the first set being effective to cause a spark plug to be fired at high load conditions to ignite a mixture in the cylinder, and the second set is time-related to the first set to cause the spark plug to be fired at a later time than the first set, and the ignition retarding means including means disabling the first set at low load conditions.

10. Apparatus according to claim 8 in which vaporizing means is provided for vaporizing fuel to assist in providing a well-vaporized, uniform and homogeneous air/fuel mixture.

11. Apparatus according to claim 10 in which the said engine also includes a throttle in said induction means, and the induction means includes a bounding wall and in which the means for constituting said charge comprises a carburetor low load circuit which discharges fuel into the induction means through an entry port adjacent to the throttle, and in which said vaporizing means comprises a groove in the wall of the induction means downstream from the said entry port, which groove conducts fuel collected by it to, and discharges it at, a location where the fuel re-enters the air stream adjacent to the throttle.

12. Apparatus according to claim 10 in which said vaporizing means comprises a portion of the wall of the induction means adjacent to the intake valve seat which is heated by heat conducted to it from the combustion chamber dome, whereby to provide a surface temperature sufficient to vaporize a fuel film which contacts it.

13. Apparatus according to claim 12 in which said wall portion is without cooling means which would reduce its temperature below that at which vaporization occurs.

14. Apparatus according to claim 1 in which said engine includes a plurality of combustion chambers, and an individual induction means and a throttle for each cylinder, and in which exhaust gas recirculation means interconnects the exhaust means and each of the induction means through an exhaust gas recirculation valve, and in which isolation means is provided between each induction means and said recirculation means to limit the reduction of pressure in any one of said induction means as the consequence of a lower pressure existing in any one of the other induction means.

15. Apparatus according to claim 14 in which said isolation means comprises a unidirectional check valve.

16. Apparatus according to claim 14 in which said isolation means comprises a fluid-restrictive orifice.

17. Apparatus according to claim 1 in which the engine includes a throttle in the induction means, and in which a carburetor starting circuit, operable under starting and warm-up condition, is provided to introduce air/fuel mixture into the induction means under starting and warm-up conditions, said starting circuit discharging air/fuel mixture into said induction means downstream of the throttle.

18. In an internal combustion engine of the type which includes a combustion chamber, induction means including an interior wall defining an inlet passage for introducing an air/fuel charge to said combustion chamber, a throttle in said induction means, and exhaust means for exhausting a spent charge from said combustion chamber, the improvement comprising: means for constituting in said induction means said air/fuel charge which is leaner than stoichiometric with the possible exceptions of starting and warm-up operations, and leaner than stoichiometric, or stoichiometric, or nearly stoichiometric, at starting and warm-up operations; means tending to maintain the numerical value of the residual fraction at low load conditions such that the engine operates on said air/fuel charge at said low load conditions without substantial misfiring, said residual fraction being defined as follows:

$$\text{Residual fraction} = \frac{\text{Amount of residual gases remaining in combustion chamber from previous cycle}}{\text{Amount of air (or air/fuel mixture) taken into combustion chamber for next cycle} + \text{Amount of residual gases remaining in combustion chamber from previous cycle}}$$

vaporizing means for maintaining the said interior wall of the induction means downstream from said means for constituting an air/fuel charge substantially free from liquid fuel deposited from said charge, thereby to assist in providing a well-vaporized, uniform and homogeneous air/fuel charge in said induction means; and a carburetor starting circuit forming part of said mean for introducing air/fuel mixture, said starting circuit being operable under starting and warm-up conditions to introduce air/fuel mixture into the induction means under starting and warm-up conditions, said starting circuit discharging air/fuel mixture into said induction means downstream of the throttle.

19. In combination: apparatus according to claim 1 in which said engine also includes a throttle in said induction means, and ignition means, and in which said means tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle position.

20. Apparatus according to claim 19 in which vaporizing means is provided for vaporizing fuel to assist in providing a well-vaporized, uniform and homogeneous air/fuel mixture.

21. Apparatus according to claim 19 in which the induction means includes a bounding wall and in which the means for constituting said charge comprises a carburetor low load circuit which discharges fuel into the induction means through an entry port adjacent to the throttle, and in which said vaporizing means comprises a groove in the wall of the induction means downstream from the said entry port, which groove conducts fuel collected by it to, and discharges it at, a location where the fuel re-enters the air stream adjacent to the throttle.

22. Apparatus according to claim 19 in which said induction means includes a bounding wall and in which said vaporizing means comprises a portion of the wall of the induction means adjacent to the intake valve seat which is heated by heat conducted to it from the combustion chamber, whereby to provide a surface temperature sufficient to vaporize a fuel film which contacts it.

23. Apparatus according to claim 22 in which the induction means includes a bounding wall and in which the means for constituting said charge comprises a carburetor low load circuit which discharges fuel into the induction means through an entry port adjacent to the throttle, and in which said vaporizing means comprises a groove in the wall of the induction means downstream from the said entry port, which groove conducts fuel collected by it to, and discharges it at, a location where the fuel re-enters the air stream adjacent to the throttle.

24. Apparatus according to claim 23 in which said wall portion is without cooling means which would reduce its temperature below that at which vaporization occurs.

25. In combination: apparatus according to claim 1; and a thermal reactor comprising a chamber in the exhaust means, said thermal reactor being insulated so as to maintain a temperature in said chamber sufficient to consume therein at least some of any hydrocarbon emitted from said cylinder.

26. A combination according to claim 25 in which thermally-controlled cooling means is provided in said reactor to limit the maximum temperature therein.

27. Apparatus according to claim 1 in which the combustion chamber includes a head with a recess therein, and a flattened squish area facing the piston.

28. Apparatus according to claim 1 in which the engine includes a throttle in said induction means and in which the means for constituting said charge comprises a fuel injector discharging fuel into the induction means downstream from the throttle.

29. Apparatus according to claim 1 in which the engine includes a throttle in the induction means, and in which the means for constituting said charge comprises a carburetor having a low load circuit and a high load circuit, the low load circuit discharging fuel into the induction means adjacent to the throttle, and the high load circuit discharging fuel upstream from the throttle.

30. Apparatus according to claim 2 in which the said engine also includes a throttle in said induction means, and the induction means includes a bounding wall and in which the means for constituting said charge comprises a carburetor low load circuit which discharges fuel into the induction means through an entry port adjacent to the throttle, and in which said vaporizing means comprises a groove in the wall of the induction means downstream from the said entry port, which groove conducts fuel collected by it to, and discharges it at, a location where the fuel re-enters the air stream adjacent to the throttle.

31. Apparatus according to claim 2 in which said vaporizing means comprises a portion of the wall of the induction means adjacent to the intake valve seat which is heated by heat conducted to it from the combustion chamber dome, whereby to provide a surface temperature sufficient to vaporize a fuel film which contacts it.

32. Apparatus according to claim 31 in which said wall portion is without cooling means which would reduce its temperature below that at which vaporization occurs.

33. Apparatus according to claim 28 in which the fuel injector discharges fuel into the induction means periodically excluding the time between about 30° and 150° after top dead center of the intake stroke.

34. Apparatus according to claim 28 in which said vaporizing means comprises a portion of the wall of the induction means adjacent to the intake valve seat which is heated by heat conducted to it from the combustion chamber dome, whereby to provide a surface temperature sufficient to vaporize a fuel film which contacts it.

35. Apparatus according to claim 34 in which the fuel injector discharges fuel into the induction means periodically excluding the time between about 30° and 150° after top dead center of the intake stroke.

36. Apparatus according to claim 35 in which said wall portion is without cooling means which would reduce its temperature below that at which vaporization occurs.

37. In combination: apparatus according to claim 3 in which said engine also includes a throttle in said induction means, and ignition means, and in which said means tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle position.

38. Apparatus according to claim 1 in which said means for constituting said charge includes a low load circuit which supplies at least 70% of the weight of the fuel introduced by it in droplets having a diameter no greater than about 0.02mm.

39. Apparatus according to claim 2 in which said induction means includes a bounding wall, and in which said vaporizing means comprises a portion of the wall of the induction means adjacent to the intake valve seat which is heated by heat conducted to it from the combustion chamber dome, whereby to provide a surface temperature sufficient to vaporize a fuel film which contacts it.

40. Apparatus according to claim 39 in which said wall portion is without cooling means which would reduce its temperature below that at which vaporization occurs.

41. Apparatus according to claim 39 in which the temperature of the wall is maintained between about 90° C. and about 135° C.

42. A method of operating an internal combustion engine of the type which includes a combustion chamber, induction means for introducing an air/fuel charge to said combustion chamber, and exhaust means for exhausting a spent charge from said combustion chamber, said method comprising: introducing to said induction means an air/fuel mixture which is always leaner than stoichiometric with the possible exceptions of starting and warm-up operations, and leaner than stoichiometric, or stoichiometric, or nearly stoichiometric, at starting and warm-up operations, and maintaining the numerical value of the residual fraction at low load conditions such that the engine operates on said air/fuel mixture at said low load conditions without substantial misfiring, said residual fraction being defined as follows:

$$\text{Residual fraction} = \frac{\text{Amount of residual gases remaining in combustion chamber from previous cycle}}{\text{Amount of air (or air/fuel mixture) taken into combustion chamber for next cycle} + \text{Amount of residual gases remaining in combustion chamber from previous cycle}}$$

43. The method of claim 42 in an engine which includes a throttle in said induction means, and ignition means to ignite the charge in the combustion chamber, in which the throttle is set at low load conditions at a position which will pass air sufficient to operate the engine at a higher speed if the ignition means were set to provide maximum engine speed for that throttle position, the ignition means being retarded to reduce the engine speed.

44. The method of claim 43 in an engine wherein the induction means includes a bounding wall, in which said method includes heating at least a portion of said wall to vaporize liquid fuel which contacts it.

45. The method of claim 43 in which liquid fuel collecting as a film is collected and re-introduced into a stream flowing through the induction means.

46. The method of claim 42 in which at least about 70% of the weight of fuel is in droplets having a diameter less than about 0.01mm.

47. Apparatus according to claim 1 in which the means for constituting said charge at low load conditions comprises a carburetor low load circuit which discharges fuel into the induction means, said circuit including a conduit wherein said fuel flows as a peripheral layer.

48. Apparatus according to claim 18 in which said means for constituting said charge includes a carburetor low load circuit which extends from a carburetor to said induction means to supply an air/fuel emulsion thereto at low load engine conditions, said low load circuit including a cylindrically tubular conduit, said carburetor having a bleed orifice to admit air to provide air for power to drive emulsion through the low load circuit, said bleed orifice having a diameter $d_o$, the induction means where the conduit enters having a diameter D, and the conduit itself having a maximum diameter $d$, wherein the ratio $d_o/D$ is in the numerical range between about 0.035 to about 0.065, and where, when the low load system is to supply only one combustion chamber, the ratio $d/D$ is in the numerical range between about 0.035 and 0.100, the scale formula for adapting the said low load circuit to the supply of a plurality of combustion chambers being as follows:

dimension $d^*$ for a carburetor modified to supply a plurality of combustion chambers = $\sqrt{n(d-1.0)^2 + 1.0}$ where $n$ is the number of combustion chambers, whereby said fuel flows as a fully peripheral layer on the wall of the conduit.

49. Apparatus according to claim 18 in which said means for constituting said charge is so proportioned and arranged that at least approximately 70% of the weight of the fuel supplied by it is in droplets having a diameter less than about 0.02 mm.

50. Apparatus according to claim 48 in which said engine also includes ignition means, and a throttle in said induction means, and in which said means tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle condition, and in which said exhaust means includes a reactor with a chamber in which at least some of the hydrocarbons emitted from the combustion chamber are oxidized.

51. Apparatus according to claim 50 in which said vaporizing means comprises a portion of the wall of the induction means adjacent to the intake valve seat which is maintained at a surface temperature sufficient to vaporize at least the major portion of a fuel film which contacts it.

52. Apparatus according to claim 51 in which means is provided for recirculating a portion of the exhaust gases from the exhaust means to the induction means.

53. Apparatus according to claim 48 in which said engine includes a plurality of combustion chambers, and an individual induction means and a throttle for each cylinder, and in which exhaust gas recirculation means interconnects the exhaust means and each of the induction means through an exhaust gas recirculation valve, and in which isolation means is provided between each induction means and said recirculation means to limit the reduction of pressure in any one of said induction means as the consequence of a lower pressure existing in any one of the other induction means.

54. Apparatus according to claim 53 in which said combustion chamber includes a dome, and in which said vaporizing means comprises a portion of the wall of the induction means adjacent to the intake valve seat which is heated by heat conducted to it from the combustion chamber dome, whereby to provide a surface temperature sufficient to vaporize at least the major portion of a fuel film which contacts it.

55. Apparatus according to claim 48 in which the vaporizing means constitutes a portion of the wall of the induction means adjacent to the intake seat without cooling means of capacity sufficient to reduce the wall temperature below that at which substantial vaporization of liquid fuel thereon will occur.

56. Apparatus according to claim 55 in which said combustion chamber includes a dome, and in which said portion of the wall is contiguous to the combustion chamber dome to receive heat by conduction therefrom.

57. Apparatus according to claim 48 in which the combustion chamber includes a head with a recess therein, and a substantially planar squish area facing the piston.

58. Apparatus according to claim 18 in which said engine includes a plurality of combustion chambers, and an individual induction means and a throttle for each cylinder, and in which exhaust gas recirculation means interconnects the exhaust means and each of the induction means through an exhaust gas recirculation valve, and in which isolation means is provided between each induction means and said recirculation means to limit the reduction of pressure in any one of said induction means as the consequence of a lower pressure existing in any one of the other induction means.

59. Apparatus according to claim 18 in which said engine also includes ignition means, and a throttle in said induction means, and in which said means tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle condition, and in which said exhaust means includes a reactor with a chamber in which at least some of the hydrocarbons emitted from the combustion chamber are oxidized.

60. Apparatus according to claim 18 in which said vaporizing means comprises a portion of the wall of the induction means adjacent to the intake valve seat which is maintained at a surface temperature sufficient to vaporize at least the major portion of a fuel film which contacts it.

61. Apparatus according to claim 60 in which said combustion chamber includes a dome, and in which said portion of the wall is contiguous to the combustion chamber dome to receive heat by conduction therefrom.

62. Apparatus according to claim 18 in which said combustion chamber includes a dome, and in which a portion of said wall is contiguous to the combustion chamber dome to receive heat by conduction therefrom.

63. A method of operating an internal combustion engine of the type which includes a combustion chamber, induction means for introducing an air/fuel charge to said combustion chamber, said induction means having an interior wall, and exhaust means for exhausting a spent charge from said combustion chamber, said method comprising: introducing to said induction means an air/fuel mixture which is always leaner than stoichiometric with the possible exceptions of starting and warm-up operations, and leaner than stoichiometric, or stoichiometric or nearly stoichiometric, at starting and warm-up operations, and maintaining the numerical value of the residual fraction at low load conditions, such that the engine operates on said air/fuel mixture at said low load conditions without substantial misfiring, said residual fraction being defined as follows:

$$\text{Residual fraction} = \frac{\text{Amount of residual gases remaining in combustion chamber from previous cycle}}{\text{Amount of air (or air/fuel mixture) taken into combustion chamber for next cycle} + \text{Amount of residual gases remaining in combustion chamber from previous cycle}}$$

maintaining the said interior wall of the induction means substantially free from liquid fuel deposited from said charge, and under starting and warm-up conditions discharging through a starting circuit an air/fuel mixture into said induction means downstream from a throttle placed in said induction means.

64. A method according to claim 63 additionally including supplying an air/fuel emulsion to the induction means at low load engine conditions through a conduit that forms part of a carburetor low load circuit, maintaining a flow of fuel and emulsion in said conduit in fully peripheral contact with the wall of the conduit.

65. A method according to claim 63 in an engine which includes a throttle in said induction means, and ignition means to ignite the charge in the combustion chamber, setting the throttle at low load conditions at a position which will pass air sufficient to operate the engine at a higher speed if the ignition means were set to provide maximum engine speed for that throttle position, and retarding the ignition means to reduce the engine speed at said low load condition.

66. A method according to claim 65 in which the induction means includes a bounding wall, in which said vaporizing includes heating at least a portion of said wall to vaporize liquid fuel which contacts it.

67. A method according to claim 63 additionally including recirculating a portion of the exhaust gases from the exhaust means to the induction means in at least some engine operating conditions.

68. A method according to claim 63 in an engine which includes a plurality of combustion chambers, and an individual induction means and a throttle for each cylinder, additionally including recirculating exhaust gas from the exhaust means to the induction means, isolating the induction means from one another.

69. A method according to claim 68 in which said combustion chamber includes a dome, and in which a portion of a wall is contiguous to the combustion chamber dome to receive heat by conduction therefrom.

70. A method according to claim 63 in which the charge is subjected to a squish action in the combustion chamber.

71. A combination according to claim 25 in which vaporizing means is provided for vaporizing fuel introduced into the induction means to assist in providing a well-vaporized uniform and homogeneous air/fuel mixture in said induction means.

72. A combination according to claim 71 in which said means for constituting said charge includes a carburetor low load circuit which extends from a carburetor to said induction means to supply an air/fuel emulsion thereto at low load engine conditions, said low load circuit including a cylindrically tubular conduit, said carburetor having a bleed orifice to admit air to provide air for power to drive emulsion through the low load circuit, said bleed orifice having a diameter $d_o$, the induction means where the conduit enters having a diameter D, and the conduit itself having a maximum diameter $d$, wherein the ratio $d_o/D$ is in the numerical range between about 0.035 to about 0.065, and where, when the low load system is to supply only one combustion chamber, the ratio $d/D$ is in the numerical range between about 0.035 and 0.100, the scale formula for adapting the said low load circuit to the supply of plurality of combustion chambers being as follows:

dimension $d^*$ for a carburetor modified to supply a plurality of combustion chambers = $\sqrt{n(d-1.0)^2} + 1.0$ where $n$ is the number of combustion chambers, whereby said fuel flows as a fully peripheral layer on the wall of the conduit.

73. A combination according to claim 71 in which said engine also includes a throttle in said induction means, and ignition means, and in which said means tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle position.

74. Apparatus according to claim 71 in which said vaporizing means comprises a portion of the wall of the induction means adjacent to the intake valve seat which is heated by heat conducted to it from the combustion chamber dome, whereby to provide a surface temperature sufficient to vaporize a fuel film which contacts it.

75. Apparatus according to claim 74 in which said wall portion is without cooling means which would reduce its temperature below that at which vaporization occurs.

76. Apparatus according to claim 75 in which said means for constituting said charge includes a carburetor low load circuit which extends from a carburetor to said induction means to supply an air/fuel emulsion thereto at low load engine conditions, said low load circuit including a cylindrically tubular conduit, said carburetor having a bleed orifice to admit air to provide air for power to drive emulsion through the low load circuit, said bleed orifice having a diameter $d_o$, the induction means where the conduit enters having a diameter D, and the conduit itself having a maximum diameter $d$, wherein the ratio $d_o/D$ is in the numerical range between about 0.035 to about 0.065, and where, when the low load system is to supply only one combustion chamber, the ratio $d/D$ is in the numerical range between about 0.035 and 0.100, the scale formula for adapting the said low load circuit to the supply of a plurality of combustion chambers being as follows:

dimension $d^*$ for a carburetor modified to supply a plurality of combustion chambers = $\sqrt{n(d-1.0)^2} + 1.0$ where $n$ is the number of combustion chambers, whereby said fuel flows as a fully peripheral layer on the wall of the conduit.

77. Apparatus according to claim 17 in which said means for constituting said charge includes a carburetor low load circuit which extends from a carburetor to said induction means to supply an air/fuel emulsion thereto at low load engine conditions, said low load circuit including a cylindrically tubular conduit, said carburetor having a bleed orifice to admit air to provide air for power to drive emulsion through the low load circuit, said bleed orifice having a diameter $d_o$, the induction means where the conduit enters having a diameter D, and the conduit itself having a maximum diameter $d$, wherein the ratio $d_o/D$ is in the numerical range between about 0.035 to about 0.065, and where, when the low load system is to supply only one combustion chamber, the ratio $d/D$ is in the numerical range between about 0.035 and 0.100, the scale formula for adapting the said low load circuit to supply of a plurality of combustion chambers being as follows:

dimension $d^*$ for a carburetor modified to supply a plurality of combustion chambers = $\sqrt{n(d-1.0)^2} + 1.0$ where $n$ is the number of combustion chambers, whereby said fuel flows as a fully peripheral layer on the wall of the conduit.

78. Apparatus according to claim 17 in which said means for constituting said charge is so proportioned and arranged that at least approximately 70% of the weight of the fuel supplied by it is in droplets having a diameter less than about 0.02 mm.

79. Apparatus according to claim 47 in which the carburetor low load circuit extends from a carburetor to said induction means to supply an air/fuel emulsion thereto at low load engine conditions, said conduit being cylindrically tubular, said carburetor having a bleed orifice to admit air to provide air for power to drive emulsion through the low load circuit, said bleed orifice having a diameter $d_o$, the induction means where the conduit enters having a diameter D, and the conduit itself having a maximum diameter $d$, wherein the ratio $d_o/D$ is in the numerical range between about 0.035 to about 0.065, and where, when the low load system is to supply only one combustion chamber, the ratio $d/D$ is in the numerical range between about 0.035 and 0.100, the scale formula for adapting the said low load circuit to the supply of a plurality of combustion chambers being as follows:

dimension $d^*$ for a carburetor modified to supply a plurality of combustion chambers = $\sqrt{n(d-1.0)^2} + 1.0$ where $n$ is the number of combustion chambers, whereby said fuel flows as a fully peripheral layer on the wall of the conduit.

80. Apparatus according to claim 58 in which said interior wall is without cooling means which would reduce its temperature below that at which vaporization of said fuel occurs.

81. Apparatus according to claim 58 in which said vaporizing means comprises a groove in the said interior wall downstream from an entry port therethrough, which groove conducts fuel collected by it to, and discharges it into the stream of charge at a location adjacent to the throttle.

82. Apparatus according to claim 58 in which the vaporizing means comprises a combustion chamber including a head with a recess therein, and a flat squish area facing a piston therein, said interior wall being in heat conductive contact with the said chamber.

83. Apparatus according to claim 18 in which the vaporizing means comprises a combustion chamber including a head with a recess therein, and a flat squish area facing a piston therein, said interior wall being in hear conductive contact with the said chamber.

84. Apparatus according to claim 18 in which said vaporizing means comprises a groove in the said interior wall downstream from an entry port therethrough, which groove conducts fuel collected by it to, and discharges it into the stream of charge at a location adjacent to the throttle.

85. Apparatus according to claim 18 in which the engine includes ignition means, and in which said means for tending to maintain the numerical value comprises said throttle set for a low load condition at a position which will pass air sufficient to operate the engine at a higher speed if the ignition means were set to provide maximum engine speed for that throttle position, and ignition-retarding means effective only at low load conditions to retard said ignition means, whereby to reduce the engine speed for that throttle position.

86. Apparatus according to claim 18 in which said internal combustion engine also includes an intake valve seat surrounding an intake port, which interconnects the combustion chamber and the induction means, an intake valve adapted to be seated on said intake valve seat to close the intake port and to be moved away from the intake valve seat to open the intake valve port, an exhaust valve seat surrounding an exhaust port which interconnects the combustion chamber and the exhaust means, an exhaust valve adapted to be seated on said exhaust valve seat to close the exhaust port and to be moved away from the exhaust valve seat to open the exhaust port, and in which said means tending to maintain the numerical value comprises means for actuating the intake and the exhaust valves, and valve overlap selecting means effective selectively to vary the duration of overlap of the opening of said intake and exhaust valves, whereby to shorten the said duration when the engine operates at low load conditions, and to lengthen it when the engine operates at high load conditions.

87. A method according to claim 63 in which the numerical value of the residual fraction is maintained by selectively varying the duration of overlap of the opening of combustion chamber intake and exhaust valves so as to shorten the duration of said overlap when the engine operates at low load conditions, and to lengthen it when the engine operates at high load conditions.

88. Apparatus according to claim 37 in which vaporizing means is provided for vaporizing fuel introduced into the induction means to assist in providing a well-vaporized, uniform and homogeneous air/fuel mixture in said induction means.

89. In combination: a four stroke cycle, multiple combustion chamber internal combustion engine having a crankshaft and a piston in each combustion chamber linked to said crankshaft whereby to turn said crankshaft when the pistons reciprocate in their respective combustion chambers; induction means comprising an individual induction tube for each combustion chamber for introducing a charge thereto; exhaust means for exhausting spent charge from said combustion chambers; an intake valve and an exhaust valve in each combustion chamber between the respective induction tube and the exhaust means, respectively; means for opening and closing said intake and exhaust valves in operating sequences; an individual throttle valve in each of said induction tubes; an individual fuel injector means for each of said induction tubes for introducing fuel or a mixture of fuel and air into its respective induction tube in quantity such as to form with air passed by the throttle valves a leaner than stoichiometric charge in the respective combustion chamber; said multiplicity of induction tubes and throttle valves comprising means for establishing the numerical value of the residual fraction at low load conditions such that the engine operates on a lean air/fuel mixture at said low load conditions without substantial misfiring, said residual fraction being defined as follows:

$$\text{Residual fraction} = \frac{\text{Amount of residual gases remaining in combustion chamber from previous cycle}}{\text{Amount of air (or air/fuel mixture) taken into combustion chamber for next cycle} + \text{Amount of residual gases remaining in combustion chamber from previous cycle}}$$

a thermal reactor comprising a chamber in the exhaust means, said thermal reactor being insulated so as to maintain a temperature in said chamber sufficient to consume therein at least some of any hydrocarbon emitted from said cylinder; vaporizing means comprising a portion of the wall of the induction means adjacent to the entry to the combustion chamber so disposed and arranged as to be heated by heat conducted to it from the dome of the combustion chamber, whereby to provide a surface temperature sufficient to vaporize a fuel film which contacts it; and the fuel injector being so arranged as to discharge fuel or a mixture of fuel and air into the induction means periodically, but not during the time between about 30° before top dead center and 150° after top dead center of the intake stroke.

90. A combination according to claim 89 in which thermally-controlled cooling means is provided in said reactor to limit the maximum temperature therein.

91. A combination according to claim 89 in which the means for establishing the numerical value of the residual fraction additionally includes exhaust gas recirculation means interconnected the exhaust means and each of the induction tubes through an exhaust gas recirculation valve, and in which isolation means is provided between each induction tube and said recirculation means to limit the reduction of pressure in any one of said induction tubes as the consequence of a lower pressure existing in any one of the other induction tubes.

92. A combination according to claim 91 in which said isolation means comprises a unidirectional check valve.

93. A combination according to claim 91 in which said isolation means comprises a fluid-restrictive orifice.

* * * * *